(12) United States Patent
Jiang et al.

(10) Patent No.: US 8,155,621 B2
(45) Date of Patent: Apr. 10, 2012

(54) REVERSE CHARGING SERVICE

(75) Inventors: John Yue Jun Jiang, Danville, CA (US); Bahadur Bhambhani, Mumbai (IN)

(73) Assignee: Roamware, Inc., San Jose, CA (US)

( * ) Notice: Subject to any disclaimer, the term of this patent is extended or adjusted under 35 U.S.C. 154(b) by 915 days.

(21) Appl. No.: 12/188,713

(22) Filed: Aug. 8, 2008

(65) Prior Publication Data
US 2009/0042539 A1 Feb. 12, 2009

Related U.S. Application Data

(60) Provisional application No. 60/935,350, filed on Aug. 8, 2007.

(51) Int. Cl.
*H04M 3/42* (2006.01)
*H04M 11/00* (2006.01)

(52) U.S. Cl. .................... 455/406; 455/408; 455/414.1; 455/445; 379/201.01

(58) Field of Classification Search .......... 455/405–409, 455/414.1, 455, 466, 414; 379/201.01, 209.01, 379/210.01, 211.01–211.02
See application file for complete search history.

(56) References Cited

U.S. PATENT DOCUMENTS

| | | | |
|---|---|---|---|
| 7,039,390 B1* | 5/2006 | Hohne et al. | 455/406 |
| 2002/0183040 A1* | 12/2002 | Lundstrom et al. | 455/406 |
| 2003/0162526 A1* | 8/2003 | Ogman et al. | 455/406 |
| 2004/0058709 A1* | 3/2004 | Zabawskyj et al. | 455/560 |
| 2004/0102180 A1* | 5/2004 | Olah | 455/406 |
| 2009/0316868 A1* | 12/2009 | Mariniello | 379/142.04 |

* cited by examiner

*Primary Examiner* — George Eng
*Assistant Examiner* — Bryan Pitt
(74) *Attorney, Agent, or Firm* — Arent Fox LLP

(57) ABSTRACT

The present invention provides systems and methods for facilitating mobile communication between a calling party and a called party. Aspects of the present invention include establishing, via a service node, mobile communications upon receiving a response, from the called party, to a mobile communication request made by the calling party to the service node, and further include facilitating, via the service node, charging the called party for the established mobile communications.

22 Claims, 15 Drawing Sheets

System for reverse charge service

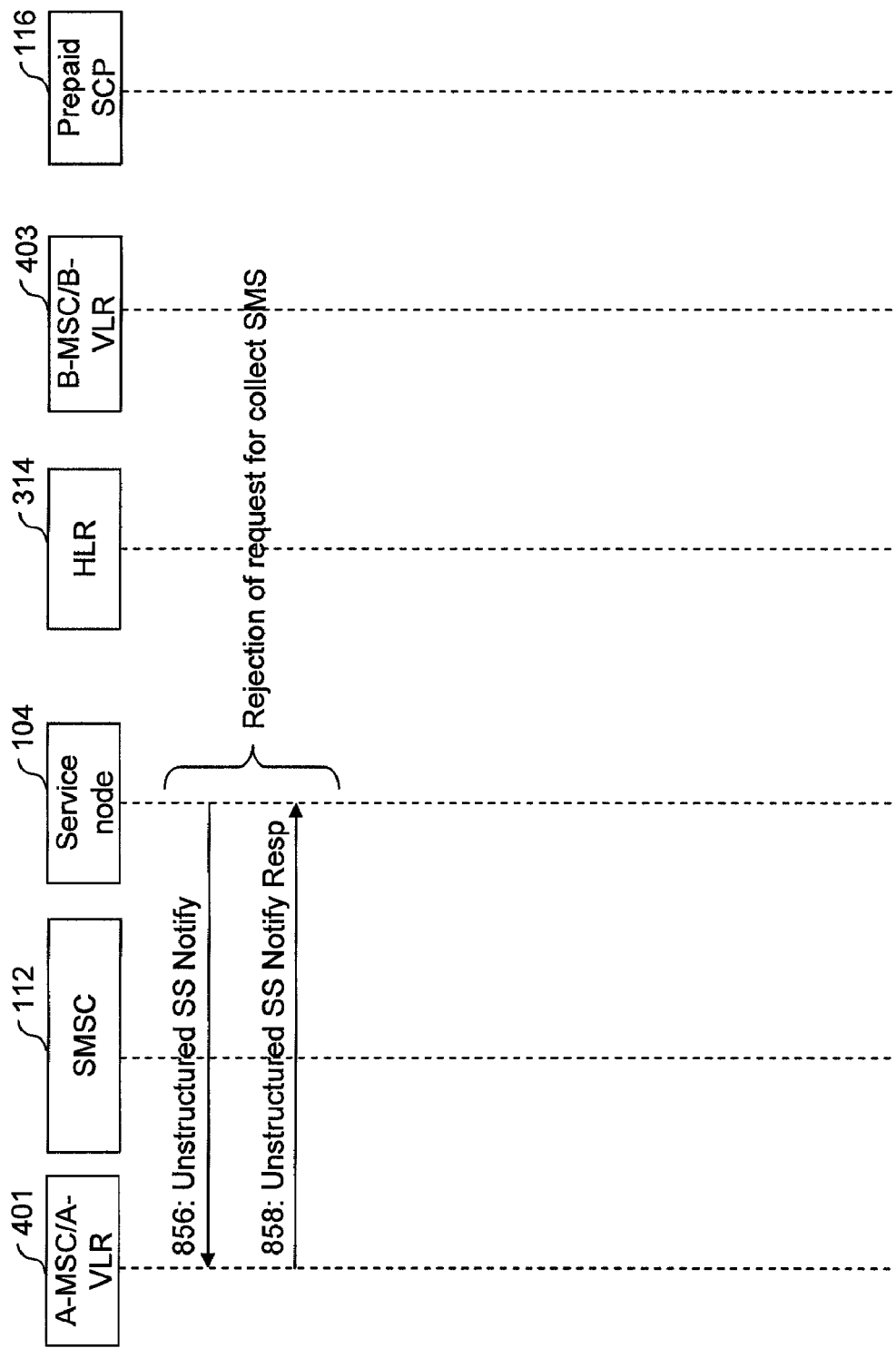

REVERSE CHARGING SERVICE

RELATED APPLICATIONS

This application claims the benefit of U.S. Provisional Application No. 60/935,350 titled "Collect Call for GSM Networks Called Party Pays for Mobile Originated Calls" filed Aug. 8, 2007, the entirety of which is incorporated by reference herein.

FIELD OF THE INVENTION

The present invention generally relates to mobile communication. More specifically, the invention relates to enabling mobile activities for a calling party without charging him for the same.

BACKGROUND OF THE INVENTION

Mobile communication during roaming contributes a major percentage of a network operator's revenue and specifically, voice traffic and SMS traffic contributes even better percentage of the network operator's margin. With increasing competition and regulatory control, network operators look for solutions to enhance both local and roaming revenues.

Mobile subscribers can be both prepaid and postpaid. Generally, prepaid subscribers are in majority since the prepaid services are relatively easier and quicker to avail of as compared to postpaid services. Usually, the network operators restrict their pre-paid subscribers from initiating calls while roaming in other networks. This is due to the network operator's lack of ability to charge their pre-paid subscribers in real-time while roaming. Some existing approaches that provide ability to handle prepaid outbound roaming to the network operator includes Customized Application for Mobile Enhanced Logic (CAMEL) service and Unstructured Supplementary Service Data (USSD) call back service. However, CAMEL services require a home network operator and a visited network operator to have CAMEL support and a CAMEL roaming agreement with each other. Also, USSD call back approach does not provide a good user experience for initiating outgoing calls. Further, one limitation of both these approaches is that in case the pre-paid subscriber has no balance in his pre-paid account, then the pre-paid subscriber cannot make calls while roaming, unless he recharges his pre-paid account while roaming. Further, there may be situations when postpaid subscribers would not like to make calls and send SMS during roaming to avoid airtime charges. This may result in loss of potential revenues for the network operators.

Network operators face similar problems even for local subscribers. Majority of total subscriber base of networks operators are pre-paid subscribers. These pre-paid subscribers are cost-conscious, e.g., they minimize their call activities to minimize cost. Additionally, if these local pre-paid subscribers have no balance in their pre-paid accounts, then cannot make calls, which again results in the loss of potential revenues for the network operators. Further, when the outgoing calls and outgoing SMS for a postpaid subscriber are barred, then the post paid subscriber cannot make calls and send SMS, which again results in the loss of potential revenue for the network operators.

In accordance with the foregoing, there is a need in the art of a system, a method, and a computer product for allowing pre-paid and post-paid subscribers to be able to make calls and send SMS without being charged for the same.

SUMMARY

The present invention is directed towards a method for facilitating mobile communication between a calling party and a called party. The method includes establishing the mobile communication, by a service node, upon receiving a response from the called party for a mobile communication request made by the calling party to the service node. The method further includes facilitating by the service node, charging of the called party for the established mobile communication.

The present invention also presents a system for facilitating mobile communication between a calling party and a called party. The system includes a service node for establishing the mobile communication, upon receiving a response from the called party for a mobile communication request made by the calling party to the service node. Further, the service node facilitates charging of the called party for the established mobile communication.

The present invention also presents provides a computer program product including a computer usable program code for facilitating mobile communication between a calling party and a called party, by establishing the mobile communication, by a service node, upon receiving a response from the called party for a mobile communication request made by the calling party to the service node. Further, the computer program product facilitates by the service node, charging of the called party for the established mobile communication.

BRIEF DESCRIPTION OF DRAWINGS

In the drawings, the same or similar reference numbers identify similar elements or acts.

FIGS. 8A, 8B, 8C and 8D illustrate a flow diagram for implementing reverse charge service for a collect SMS by calling party, in accordance with an embodiment of the present invention.

DETAILED DESCRIPTION

In the following description, for purposes of explanation, specific numbers, materials and configurations are set forth in order to provide a thorough understanding of the present invention. It will be apparent, however, to one having ordinary skill in the art that the present invention may be practiced without these specific details. In some instances, well-known features may be omitted or simplified, so as not to obscure the present invention. Furthermore, reference in the specification to "one embodiment" or "an embodiment" means that a particular feature, structure or characteristic, described in connection with the embodiment, is included in at least one embodiment of the present invention. The appearance of the phrase "in an embodiment", in various places in the specification, does not necessarily refer to the same embodiment.

Figure 1:
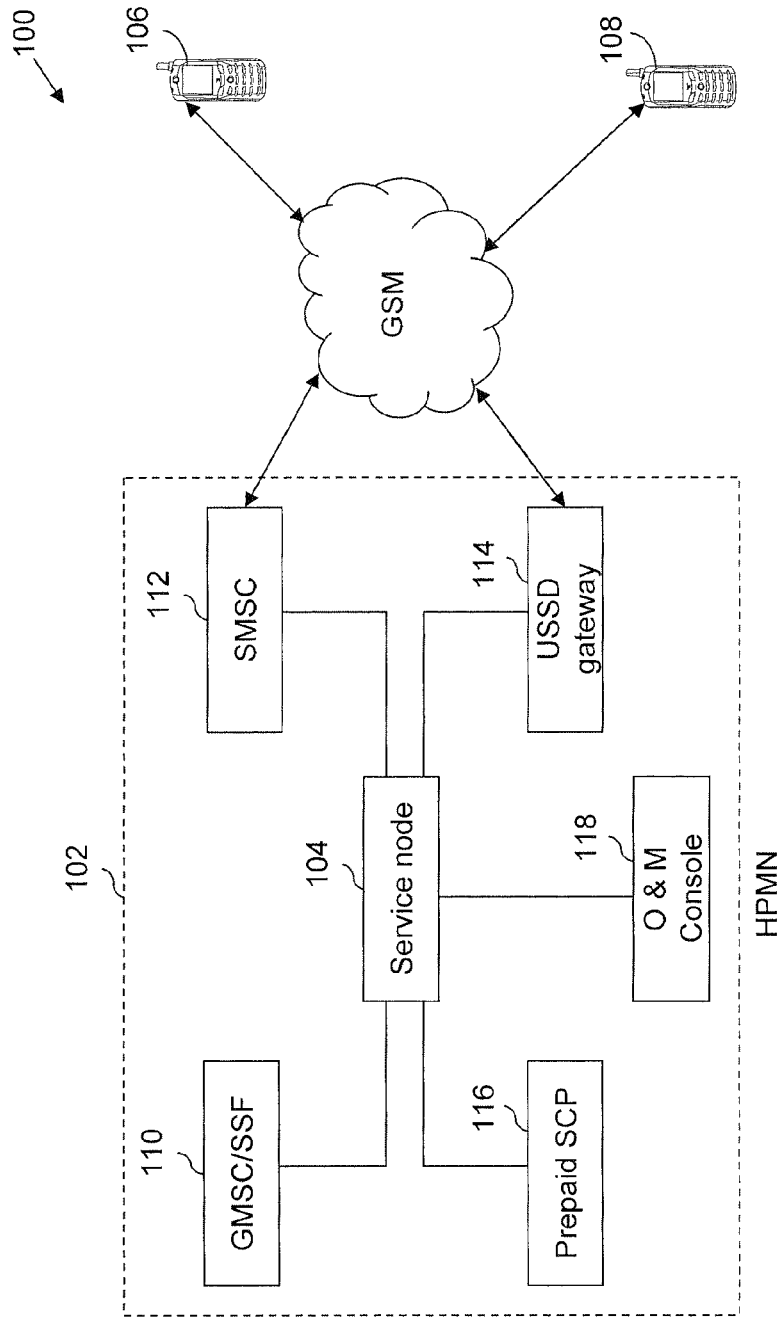
FIG. 1 illustrates a system for implementing reverse charge service for a subscriber of Home Public Mobile Network (HPMN), in accordance with an embodiment of the present invention.

The present invention provides a system, a method, and a computer program product where a home network allows a calling party to initiate mobile communication like Mobile Originated (MO) calls or Short Message Service (SMS) for which a called party pays. This arrangement of mobile communication is hereinafter interchangeably referred to as "reverse charge service", where the charges for the call and SMS by the calling party are collected from the called party. FIG. 1 illustrates a system 100 for implementing reverse charge service for a subscriber of Home Public Mobile Network (HPMN) 102, in accordance with an embodiment of the present invention. HPMN 102 includes a service node 104 that establishes mobile communication between a calling party 106 (i.e., the subscriber of HPMN 102) and a called party 108 (i.e., a subscriber of same operator as HPMN 102), and also facilitates charging called party 108 for the established mobile communication. Voice calls initiated by calling party 106 with the help of reverse charge service (i.e., via service node 104) to called party 108, for which called party 108 pays is hereinafter interchangeably referred to as "Collect Call". Similarly, the SMSs sent by calling party 106 with the help of reverse charge service (i.e., via service node 104) to called party 108, for which called party 108 pays is hereinafter interchangeably referred to as "Collect SMS". In an embodiment of the present invention, a subscriber of HPMN 102 first needs to register for the reverse charge service in order to make calls and send SMS that are paid by a called subscriber. Thus, to register the subscriber for the reverse charge service, the subscriber details are provisioned in an application database. The application exposes a standard eXtensible Markup Language (XML) over Hypertext Transfer Protocol (HTTP) Application Programming Interface (API) which is invoked by HPMN 102 operator's provisioning system or Customer Relationship Management (CRM) system to provision subscribers in service node 104. In another embodiment of the present invention, the subscriber does not register for the reverse charge service and avails the reverse charge service on the need basis.

Service node 104 acts as an active node, and it has its own point codes and Global Titles (GTs). In a first embodiment of the present invention, service node 104 controls collect calls between calling party 106 and called party 108 through Mobile Application Part (MAP) protocol, ISDN User Part (ISUP) protocol or Intelligent Network (IN) protocol. Similarly, in a second embodiment of the present invention, service node 104 controls collect SMS between calling party 106 and called party 108 through MAP protocol or Customized Application for Mobile network Enhanced Logic (CAMEL) Application Part (CAP) protocol. In an embodiment of the present invention, both calling party 106 and called party 108 are subscribers of HPMN 102's operator. Further, calling party 106 and called party 108 can be either prepaid or postpaid subscribers. In an embodiment of the present invention, calling party 106 and called party 108 are both present in HPMN 102. In another embodiment of the present invention, calling party is present in HPMN 102 while the called party 108 is roaming in a Visited Public Mobile Network (VPMN). In yet another embodiment of the present invention, calling party 106 is roaming in the VPMN and called party 108 is present in HPMN 102. In yet another embodiment of the present invention, both calling party 106 and called party 108 are roaming in the VPMN. In various embodiments of the present invention, both HPMN 102 and the VPMN are of the same mobile operator. Further, HPMN 102 includes:

A Gateway Mobile Switching Center (GMSC)/Service Switching Function (SSF) 110 to setup collect call between calling party 106 and called party 108.

A Short Message Service Center (SMSC) 112 to send and receive SMS from calling party 106 and called party 108, respectively.

An Unstructured Supplementary Services Data (USSD) gateway 114 to send and receive USSD commands from calling party 106 and called party 108, respectively.

A prepaid Signaling Control Point (SCP) 116 to charge called party 108 for the reverse charge service when called party 108 is a prepaid subscriber.

An Operation and Maintenance (O&M) console 118 to monitor collect calls and collect SMS.

An administration console 120 to allow HPMN 102's operator to configure service node 104. In an exemplary embodiment, administration console 120 is a web-based Graphical User Interface (GUI) system containing a set of applications which provides a system administrator of the application to manage and configure a system database. An example of the application is a Black List management. This application allows the administrator to define or alter a list of subscribers who are barred from using the reverse charge service. Another example is the reports generated by service node 104. The reports shows the statistics about reverse charge service usage like the number of collect calls or collect SMS requests request received by the application, number of requests accepted and no of calls connected.

In an embodiment of the present invention, service node 104 communicates with GMSC/SSF 110 over ISUP and MAP protocols. Service node 104 further sends SMS to SMSC 112 over a Transmission Control Protocol (TCP)/Internet Protocol (IP). Additionally, service node 104 communicates with US SD gateway 114 over an XML and a Short Message Peer-to-Peer (SMPP) protocol. Service node 104 communicates with prepaid SCP 116 over CAP and Intelligent Network Application Part (INAP) protocols. Further, service node 104 communicates with O&M console 118 over a Simple Network Management Protocol (SNMP).

Figure 2:
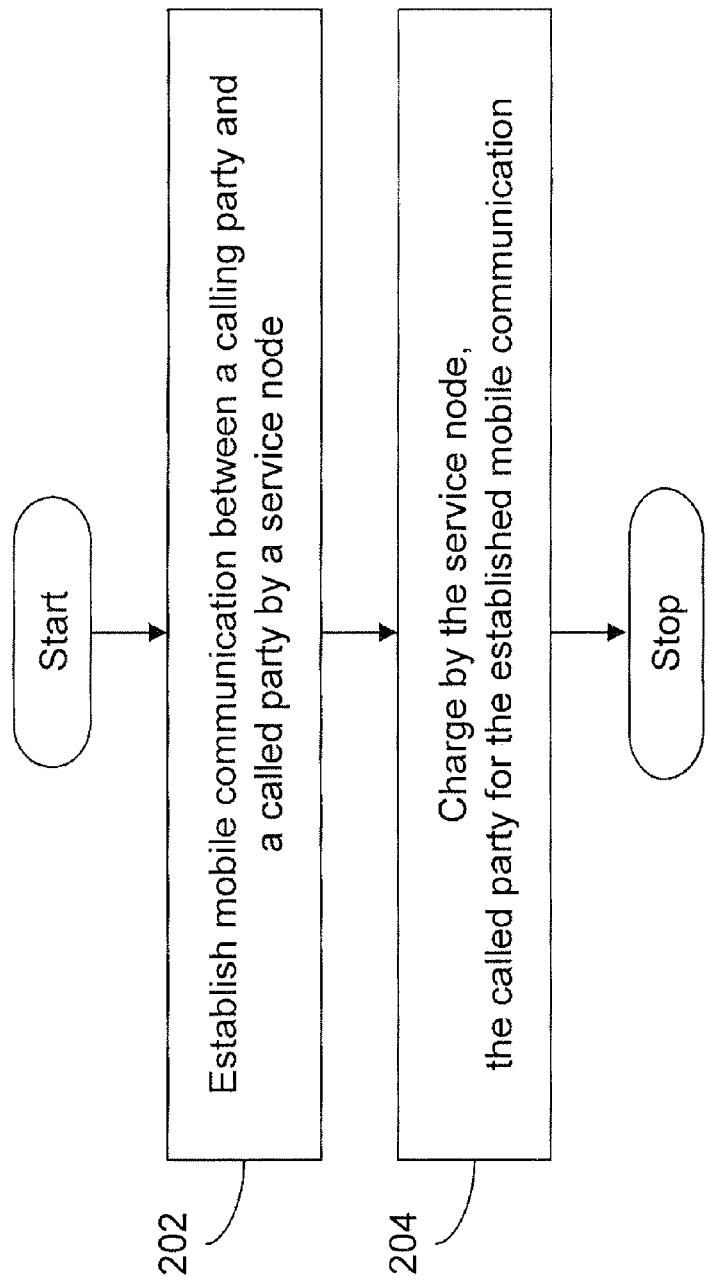
FIG. 2 illustrates a flowchart depicting the reverse charge service, in accordance with an embodiment of the present invention.

FIG. 2 illustrates a flowchart depicting the reverse charge service, in accordance with an embodiment of the present invention. At step 202, service node 104 establishes mobile communication between calling party 106 and called party 108 after receiving a response, from called party 108, for a request for mobile communication made by calling party 106. In an embodiment of the present invention, calling party 106 sends a request to service node 104 to initiate mobile communication with called party 108, and accordingly charge called party 108 for the initiated mobile communication using an interface provided by service node 104. In an embodiment of the present invention, the interface is an USSD interface. In another embodiment of the present invention, the interface is an SMS interface. In yet another embodiment of the present invention, the interface is an Interactive Voice Response (IVR) interface. After receiving the mobile communication request from calling party 106, service node 104 sends a notification to called party 108 informing about the request made by calling party 106. Thereafter, called party 108 responds to the request from calling party 106 via the interface provided by service node 104. In various embodiments of the present invention, called party 108 may use USSD, SMS or IVR as the interface to respond. In one embodiment of the present invention, the response of called party 108 is an approval to bear the charges of the requested mobile communication. In another embodiment of the present invention, the response of called party 108 is a rejection to not bear the charges of the requested mobile communication.

After receiving the response from called party 108, service node 104 notifies calling party 106 about this response. When called party 108 approves to bear the charges of the mobile communication, service node 104 establishes mobile communication between calling party 106 and called party 108. In an embodiment of the present invention, service node 104 establishes the mobile communication by first initiating a first call to calling party 106, then initiating a second call to called party 108 and finally bridging the first call and the second call in order to connect calling party 106 with called party 108. In another embodiment of the present invention, service node 104 establishes the mobile communication by first initiating the second call to called party 108, then initiating the first call to calling party 106, and then bridging the first call and the second call. In yet another embodiment of the present invention, service node 104 establishes mobile communication by initiating calls to both calling party 106 and called party 108 simultaneously, and then bridging the two calls. In an embodiment of the present invention, service node 104 bridges calling party 106 and called party 108 via an ISUP loop back method. Further, service node 104 configures Calling Line Identification (CLI) that is to be displayed to calling party 106 and called party 108. In an embodiment of the present invention, service node 104 displays the CLI of called party 108 to calling party 106 by imitating calling party 106 that called party 108's CLI is a calling party 106's number. In another embodiment of the present invention, service node 104 displays a short code for service node 104 as the CLI to calling party 106. Likewise, in an embodiment of the present invention, service node 104 displays the CLI of calling party 106 to called party 108. While, in another embodiment of the present invention, service node 104 displays the short code for service node 104 as the CLI to called party 108.

After the mobile communication has been established between calling party 106 and called party 108, service node 104 charges called party 108 for the established mobile communication at step 204. The process of billing called party 108 is described later in the context of the present invention.

Figure 3:
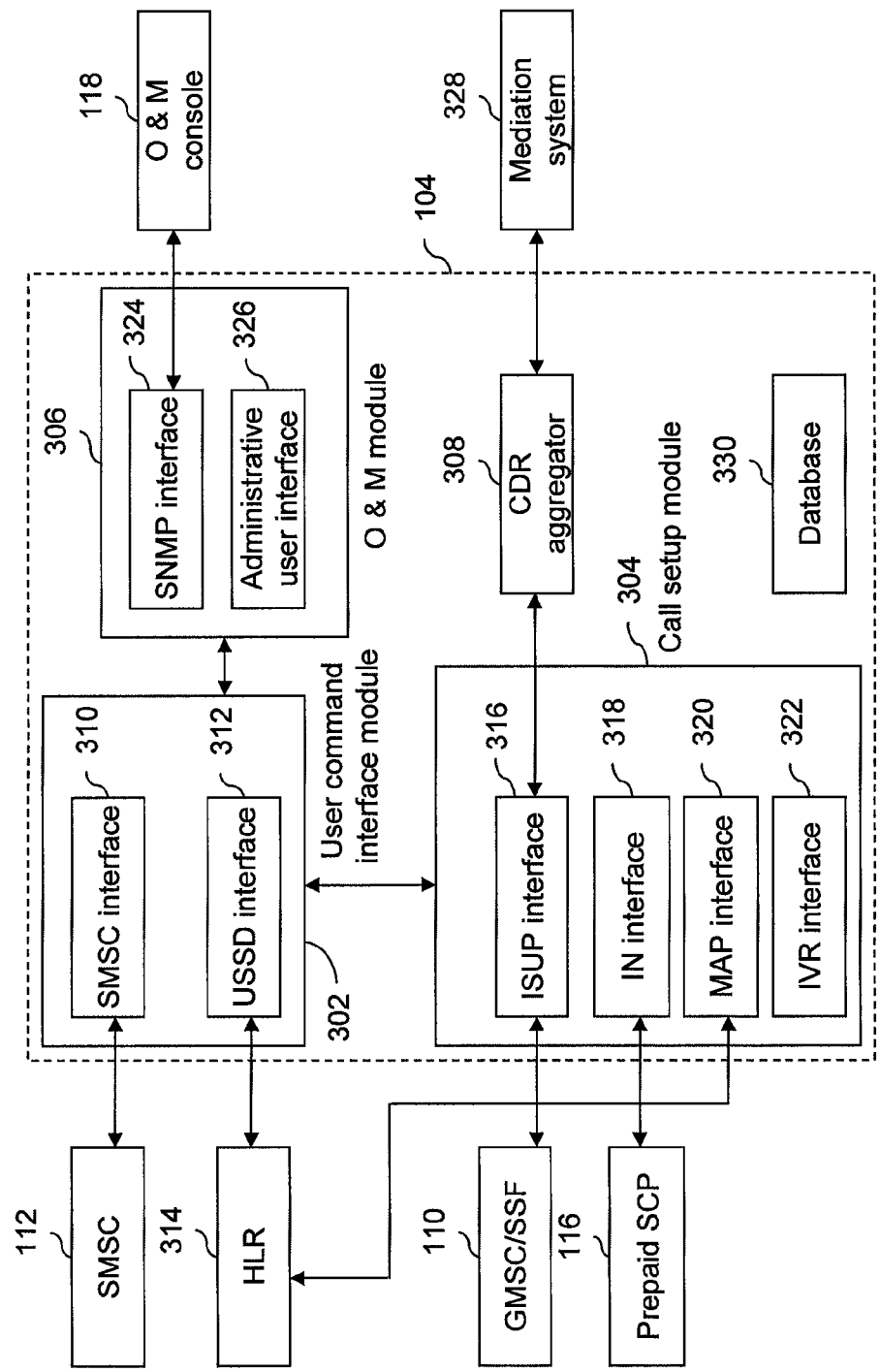
FIG. 3 illustrates an internal architecture of a service node for implementing the reverse charge service, in accordance with an embodiment of the present invention.

In order to establish mobile communication between calling party 106 and called party 108, service node 104 uses its internal modules. FIG. 3 illustrates an internal architecture of service node 104 for implementing the reverse charge service, in accordance with an embodiment of the present invention. Service node 104 includes four functional modules: a user command interface module 302, a call setup module 304, an O&M module 306 and a Call Detail Record (CDR) aggregator module 308. User command interface module 302 provides SMS, USSD and IVR interfaces to both calling party 106 and called party 108. User command interface module 302 further provides commands that can be invoked by calling party 106 to interact with service node 104. Calling party 106 can invoke such commands over SMS or USSD. User command interface module 302 further includes an SMSC interface 310 and an USSD interface 312. For sending and receiving commands over SMS, SMSC interface 310 interacts with SMSC 112. When calling party 106 chooses the USSD channel, USSD interface 312 interacts with USSD gateway 114 or a Home Location Register (HLR) 314 of HPMN 102.

Further, call setup module 304 implements all signaling and call setup functionality by interacting with GMSC/SSF 110 and prepaid SCP 116 using standard signaling protocols. Call setup module 304 further includes an ISUP interface 316, an IN interface 318, a MAP interface 320 and an Interactive Voice Response (IVR) interface 322. ISUP interface 316 interacts with GMSC/SSF 110 for processing ISUP, IN and CAMEL based call setup and tear-down messages. IN interface 318 interacts with prepaid SCP 116 using IN and CAMEL protocols for real-time charging of calls. MAP interface 320 interacts with HLR 314 using MAP protocol for call setup. IVR interface 322 is used by calling party 106 and called party 108 to interactively setup collect call.

O&M module 306 provides all functionality needed for operations and maintenance of service node 104. O&M module 306 supports SNMP alarms and notifications for all major events occurring in service node 104. O&M module 306 includes an SNMP interface 324 that exposes all critical parameters to O&M console 118, which uses these parameters for monitoring and querying for health of service node 104. O&M module 306 further includes an administrative user interface 326 that is a bundle of web-based graphical user interface that drive administration applications which can be used by service node 104's administrator to configure and control service node 104's data and features.

Furthermore, CDR aggregator module 308 is responsible for generating CDRs for all calls handled by service node 104. CDR aggregator module 308 aggregates all call events into CDRs, and then it updates them into a database 330. The CDR files can then be generated from the database. In an embodiment of the present invention, various kinds of reports are generated using the CDR for further analysis. These CDRs can be used to hand-off call data to a mediation system 328 for billing purpose.

In an embodiment of the present invention, database 330 stores a list of valid subscribers (e.g., calling party 106) that have registered for the reverse charge service. In an embodiment of the present invention, database 330 maintains a blacklist of VPMNs that charge airtime for MT calls to calling party 106, when calling party 106 is roaming in the VPMN. In another embodiment of the present invention, database 330 maintains a blacklist of calling parties whose requests for the mobile communication is blocked or rejected by called parties. In yet another embodiment of the present invention, database 330 maintains a white list of calling parties for which mobile communication is established without the requirement of the approval from called party 108.

In an embodiment of the present invention, when calling party 106 is a prepaid subscriber and he does not have sufficient balance to make calls, or when calling party 106 does not want to bear the expense of the call, or when calling party 106's outgoing calls are barred; calling party 106 initiates collect calls using the interface provided by service node 104. In order to allow only the prepaid calling party, the prepaid calling party's data is provisioned into service node 104 using a provisioning module (not shown in FIG. 3). In another embodiment of the present invention, both prepaid and postpaid calling parties are allowed to initiate calls using service node 104. In such a case, the data associated with both prepaid and postpaid calling party is not provisioned into service node 104.

Figure 4A:
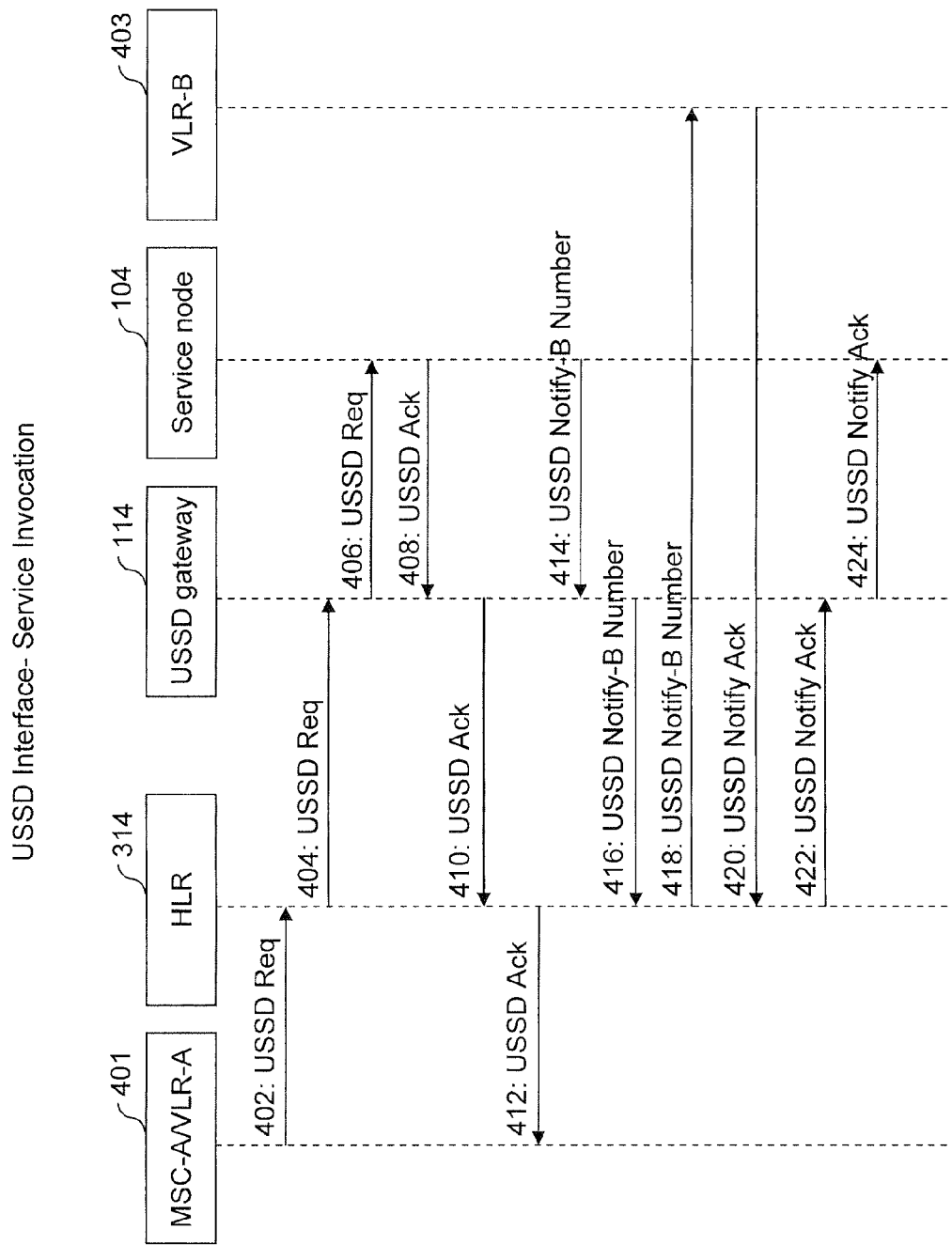
FIGS. 4A and 4B illustrate a flow diagram for invoking the reverse charge service for a collect call by the subscriber using an Unstructured Supplementary Services Data (USSD) interface, in accordance with an embodiment of the present invention.
Figure 4B:
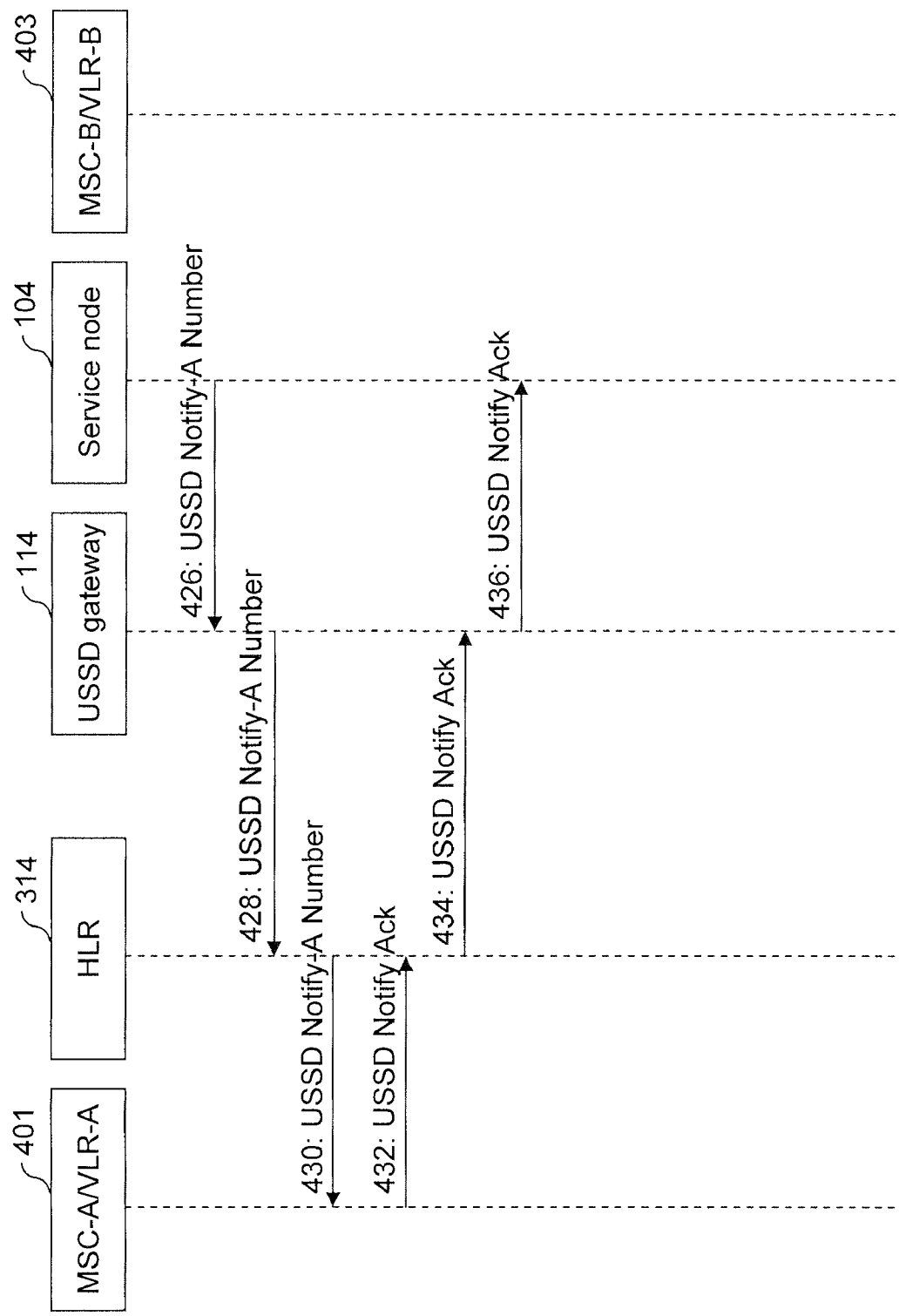

FIGS. 4A and 4B illustrate a flow diagram for invoking reverse charge service for the collect call by calling party 106 using an USSD interface, in accordance with an embodiment of the present invention. Hereinafter, calling party 106 and called party 108 will be interchangeably referred to as party A and party B, respectively. Party A initiates an USSD request towards a Visitor Location Register (VLR) 401 via an USSD command, with a service code (provided by service node 104) specific to a service (i.e., initiating calls for which called party will pay), and party B's number. Since VLR 401 caters to party A, it is hereinafter interchangeably referred to as VLR-A 401. Also, since a VLR is usually integrated with a MSC that communicate with each other, VLR-A 401 integrated with its MSC is hereinafter interchangeably referred to as MSC-A/VLR-A 401. Thereafter at step 402, VLR-A 401 forwards this request to HLR 314. At step 404, HLR 314 forwards this request to USSD gateway 114. Thereafter at step 406, the USSD request for initiating the call is received by service node 104. Thereafter, service node 104 sends an acknowledgement such as USSD Ack back to party A via VLR-A-401. This acknowledgement process is shown in step 408 and step 412. Once USSD Ack reaches VLR-A-401, it relays the USSD Ack to party A.

Thereafter at steps 414 to 416, service node 104 sends a notification to B party by sending a message USSD Notify-B number to HLR 314 via USSD gateway 114. At step 418, this notification message reaches a VLR-B 403, which further sends the notification message to party B (as VLR-B 403 is associated with party B). As mentioned above, since a VLR is usually integrated with a MSC that communicate with each other, VLR-B 403 integrated with its MSC is hereinafter interchangeably referred to as MSC-B/VLR-B 403. In an embodiment of the present invention, this notification message is to notify party B that party A wants to initiate a call with party B and that party A has requested party B to bear the charges of this call. In an embodiment of the present invention, along with this notification message, party B also receives an option 'Ok' to accept this request and an option 'Cancel' to reject this request. The 'Ok' option corresponds to accepting the request to bear the call charges and the 'Cancel' option corresponds to rejecting the request to bear the call charges. In an embodiment of the present invention, party B accepts to bear the call charges by selecting 'Ok' option. Thus, when party B selects 'Ok' option, a message such as USSD Ack is received at VLR-B 403. Thereafter, in step 420 to step 424, the USSD Notify Ack message reaches service node 104. Service node 104, upon receiving this notification message, initiates the collect call between party A and party B.

In an embodiment of the present invention, party B rejects to bear the charges of the call by selecting 'Cancel' option. Thus, when party B selects 'Cancel' option, a message USSD Ack is received at VLR-B 403. The remaining call for this USSD message to reach service node 104 is similar to steps 420 to 424. Service node 104 upon receiving the acknowledgement message with 'Cancel' option does not initiate any communication with party B. In an embodiment of the present invention, service node 104 further sends a notification to party A informing party A that party B has rejected his request for bearing the call charges. At step 426, service node 104 sends an USSD message such as an "USSD Notify-A number" message to USSD gateway 114. USSD gateway 114 forwards this message to HLR 314 at step 428. Thereafter at step 430, HLR 314 sends the USSD message to VLR-A 401, which then sends the notification message to party A. Thereafter, party A acknowledges to this notification message. Finally, VLR-A 401 sends an USSD Notify Ack message to service node 104 via HLR 314, at steps 432 to 436. In an embodiment of the present invention, when party B rejects the request of party A to bear the charges of the call, party A retries the same process of sending the same request to party B after some time (e.g., five minutes).

In an embodiment of the present invention, when service node 104 detects an Early Call Forwarding (ECF) or Late Call Forwarding (LCF) status being activated for party B, after it receives the request from party A for initiating the MO call, it sends a notification to party A that a call cannot be set to party B due to ECF. When ECF or LCF is activated for party B, the call made to party B would instead be routed to his forwarded number. In this case, although party B confirmed to take the call charges (using USSD or SMS interface), he may forget that unconditional call forwarding is active, and may end up being charged for the call which he did not have an opportunity to answer. The ECF or LCF status for party B is obtained by service node 104 by sending a MAP SRI message for party B's number to HLR 314. The call flow for sending the notification for ECF or LCF is similar to the steps 426 to 436. Even in this embodiment, the party A retries the same process of sending the request to party B after some time (e.g., five minutes In an embodiment of the present invention, when party B is not responding or is busy or waiting, then service node 104 sends a notification message to party A informing that the request made by party A cannot be processed and informing him the reason for the same.

Figure 5:
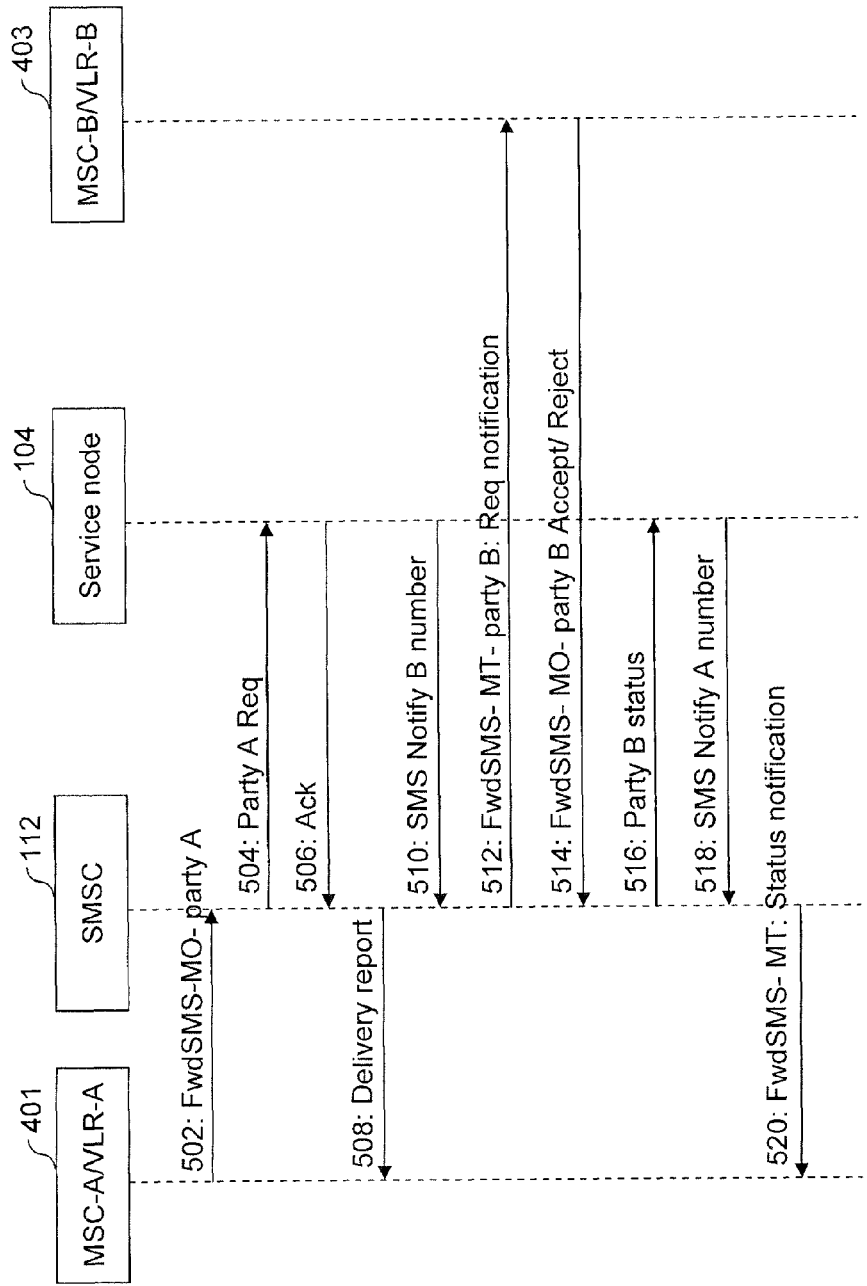
FIG. 5 illustrates a flow diagram for invoking the reverse charge service for the collect call by the subscriber using a Short Message Service (SMS) interface, in accordance with an embodiment of the present invention.

FIG. 5 illustrates a flow diagram for invoking reverse charge service for the collect call by party A using an SMS interface, in accordance with an embodiment of the present invention. In order to initiate the collect call, party A sends an MO SMS to MSC-A/VLR-A 401, providing party A's number in the SMS, with a Short Message Entity (SME) of service node 104. Subsequently, at step 502, MSC-A/VLR-A 401 originates an MO Forward SMS (FwdSMS) message, associated with party A, to SMSC 112. Thereafter, at step 504, SMSC 112 forwards this message to service node 104. In an embodiment of the present invention, SMSC 112 forwards this message over SMPP protocol. In another embodiment of the present invention, SMSC 112 forwards the message over a Computer Interface to Machine Distribution, version 2 (CIMD2) protocol.

Upon receiving party A's request, service node 104 sends an acknowledgement message back to party A via SMSC 112 and MSC-A/VLR-A 401, at steps 506 and 508. The acknowledgement message is a receipt of successful delivery of the SMS sent by party A to service node 104. Thereafter at step 510, service node 104 sends an SMS to SMSC 112 to notify party B about the request made by party A to bear the charge of the MO call. At step 512, SMSC 112 sends a Mobile Terminated (MT) FwdSMS message to MSC-B/VLR-B 403, which further sends the notification SMS to party B. In an embodiment of the present invention, this notification SMS is to notify party B that party A wants to initiate a call with party B and that party A has requested party B to bear the charges of this call. In an embodiment of the present invention, party B accepts the request of party A to bear the expense of the call and sends an SMS with 'Ok' indicating his acceptance. Thereafter, at step 514, MSC-B/VLR-B 403 sends the SMS received from party B, to SMSC 112. Further, at step 516, SMSC 112 forwards the SMS to service node 104. After receiving the notification message from party B, service node 104 initiates the collect call.

In another embodiment of the present invention, party B rejects the request of party A to bear the expense of the call and sends an SMS with 'Cancel' option indicating rejection of the request. The call flow for notifying service node 104 about the rejection status of party B is similar to as explained in steps 514 to 516. In an embodiment of the present invention, service node 104 further sends a notification to party A informing party A that party B has rejected his request for bearing the call charges. At step 518, service node 104, sends a notification message "SMS Notify A number" to SMSC 112. Thereafter at step 520, SMSC 112 sends a message "FwdSMS-MT: Status notification" to MSC-A/VLR-A 401 to notify party A that party B has rejected the request of bearing the charges of the call that will be initiated by party A. In an embodiment of the present invention, when party B rejects the request of party A to bear the charges of the call, party A retries the same process of sending the request to party B after some time (e.g., five minutes). In an embodiment of the present invention, when service node 104 detects the ECF or LCF status being activated for party B, after it receives the request from party A, it sends a notification to party A that a call cannot be set to party B due to the ECF or LCF setting. The call flow for sending this notification to party A is similar to as described in steps 518 and 520. In an embodiment of the present invention, when party B is not responding or is busy or waiting, then service node 104 sends a notification message to party A informing that the request made by party A cannot be processed and also informing him the status of party B.

Figure 6A:
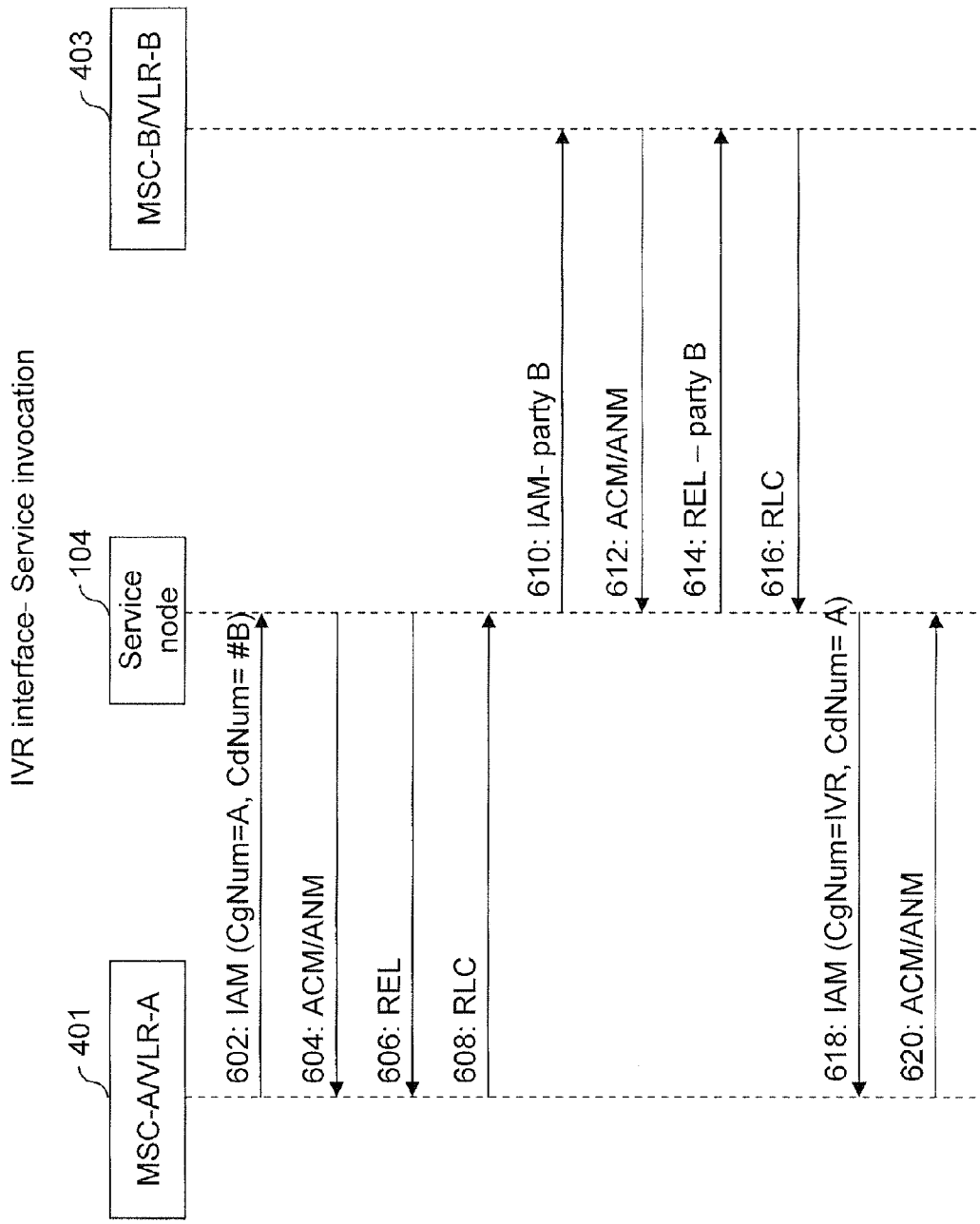
FIG. 6 illustrates a flow diagram for invoking the reverse charge service for the collect call by the subscriber using an Unstructured Supplementary Service Data (USSD) interface, in accordance with an embodiment of the present invention.
Figure 6B:
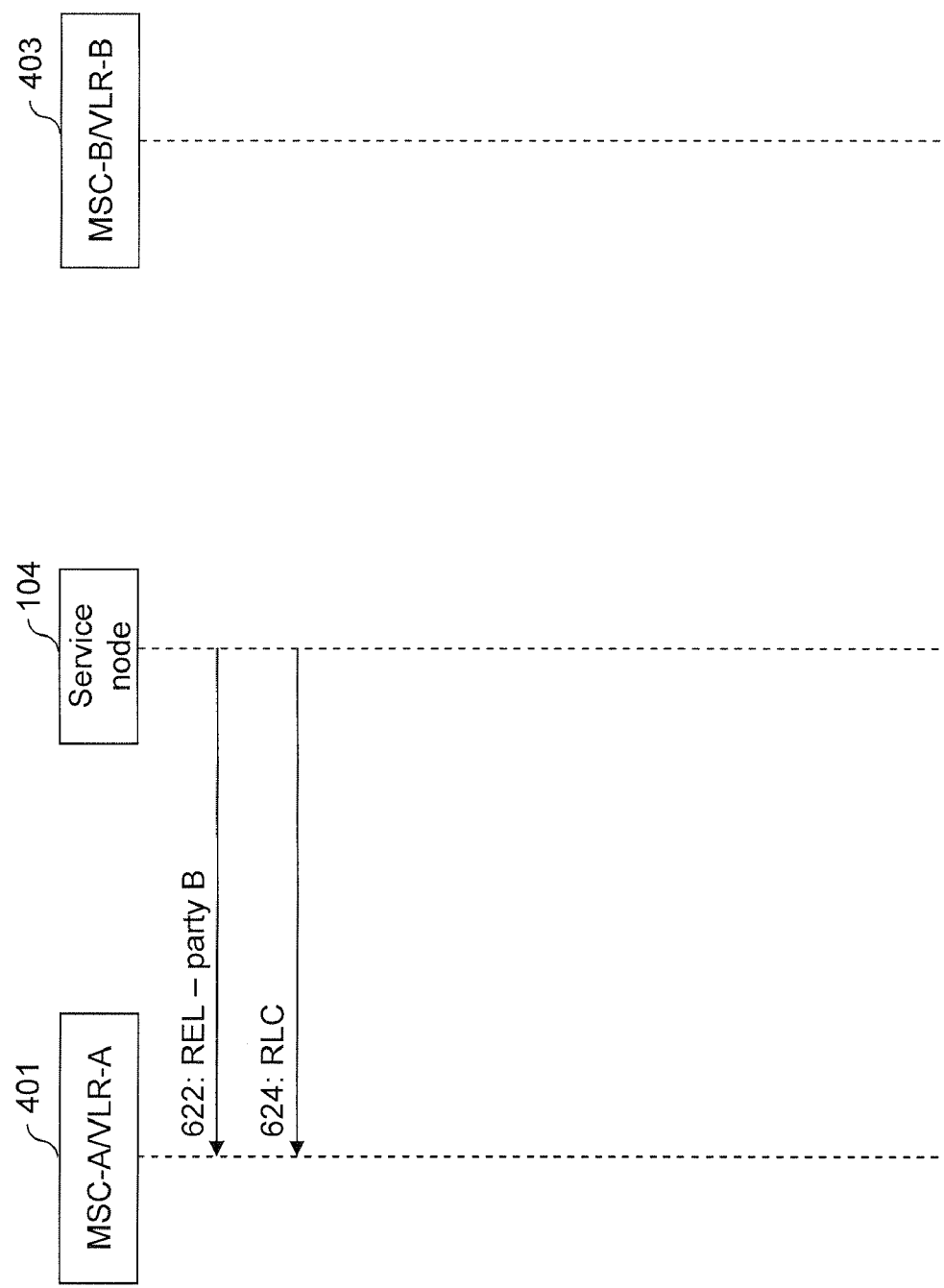

FIGS. 6A and 6B illustrate a flow diagram for invoking reverse charge service for the collect call by party A using an IVR interface, in accordance with an embodiment of the present invention. To initiate the request for the MO call, party A dials party B's number with a prefix (e.g., '*'). The call reaches to MSC-A/VLR-A 401. Thereafter at step 602, MSC-A/VLR-A 401 routes the call to service node 104. The call gets routed to service node 104 due to the prefixed number. At step 604, service node 104 answers the call via an IVR system and answer message is received at MSC-A/VLR-A 401. In an embodiment of the present invention, party A is made to hear a voice and is also requested to record his name. The IVR system then informs party A that his call would be established soon. It will be apparent to a person of ordinary skill in the art that the IVR is configurable and can be configured by service node 104 to make user hear different information. Thereafter at steps 606 and 608, service node 104 disconnects the call and release messages are exchanged between service node 104 and MSC-A/VLR-A 401.

After the request from party A has been received by service node 104, service node 104 initiates an IVR call with party B (via MSC-B/VLR-B 403) at step 610, to notify party B about the request made by party A to bear the charge of the MO call. At step 612, party B answers the IVR call and answer messages are exchanged between MSC-B/VLR-B 403. In an embodiment of the present invention, party B is made to hear a message that party A has requested to initiate a MO call with party B and wants party B to bear the charge of the call. In an exemplary case, party A message recorded by IVR system of service node 104, is made to hear to party B. In an embodiment of the present invention, party B responds to the request made by party A using Dual Tome Multi Frequency (DTMF). In an embodiment of the present invention, Party B presses '1' on a mobile phone to accept the request. Service node 104 notes this response and disconnects the call by sending a release message "REL-party B" to MSC/B-VLR-B at step 614. Thereafter, at step 616, service node 104 receives a release message RLC from MSC-B/VLR/B 403. After receiving the acceptance from party B, service node 104 initiates the collect call.

In another embodiment of the present invention, party B presses '2' on the mobile phone to reject the request made by party A. Service node 104 notes this response and disconnects the call by exchanging release messages at steps 614 and 616. In an embodiment of the present invention, after receiving a rejection for the request from party B, service node 104 at notifies party A about the rejection of the request. At step 618, service node 104 initiates an IVR call to MSC-A/VLR-A 401 with Calling Party Address (CgPA) as service node 104's number and Called Party Address (CdPA) as party A's number. When party A answers the IVR call, answer messages are exchanged between MSC-A/VLR-A 401 and service node 104 at steps 618 and 620. After party A answers the call, party A is notified by the IVR call that party B has rejected the request for collect call. Thereafter, at steps 622 and 624, the call is released by service node 104 and release messages are exchanged between service node 104 and MSC-A/VLR-A 401. In an embodiment of the present invention, when party B did not answer the call or an ECF or LCF is detected or was busy, party A is made to hear a message indicating the above said status of party B.

In an embodiment of the present invention, party B sends a 'cancel' message and the call is disconnected by service node 104. When the 'cancel' message is received at service node 104, service node 104 disconnects the call and no further communication is done by party B.

In an embodiment of the present invention, when party B rejects the request of party A to bear the charges of the call, party A retries the same process of sending the request to party B after some time (e.g., five minutes). In an embodiment of the present invention, when service node 104 detects an ECF or LCF status being activated for party B, after it receives the request from Party A for initiating the MO call, it sends a notification to Party A that a call cannot be set to the party B due to ECF or LCF. The call flow for sending this notification to party A is similar to as discussed in steps 618 and 620. In another embodiment of the present invention, party A is notified using a USSD message. In yet another embodiment of the present invention, party A is notified by service node 104 by sending a SMS to service node 104.

Figure 7A:
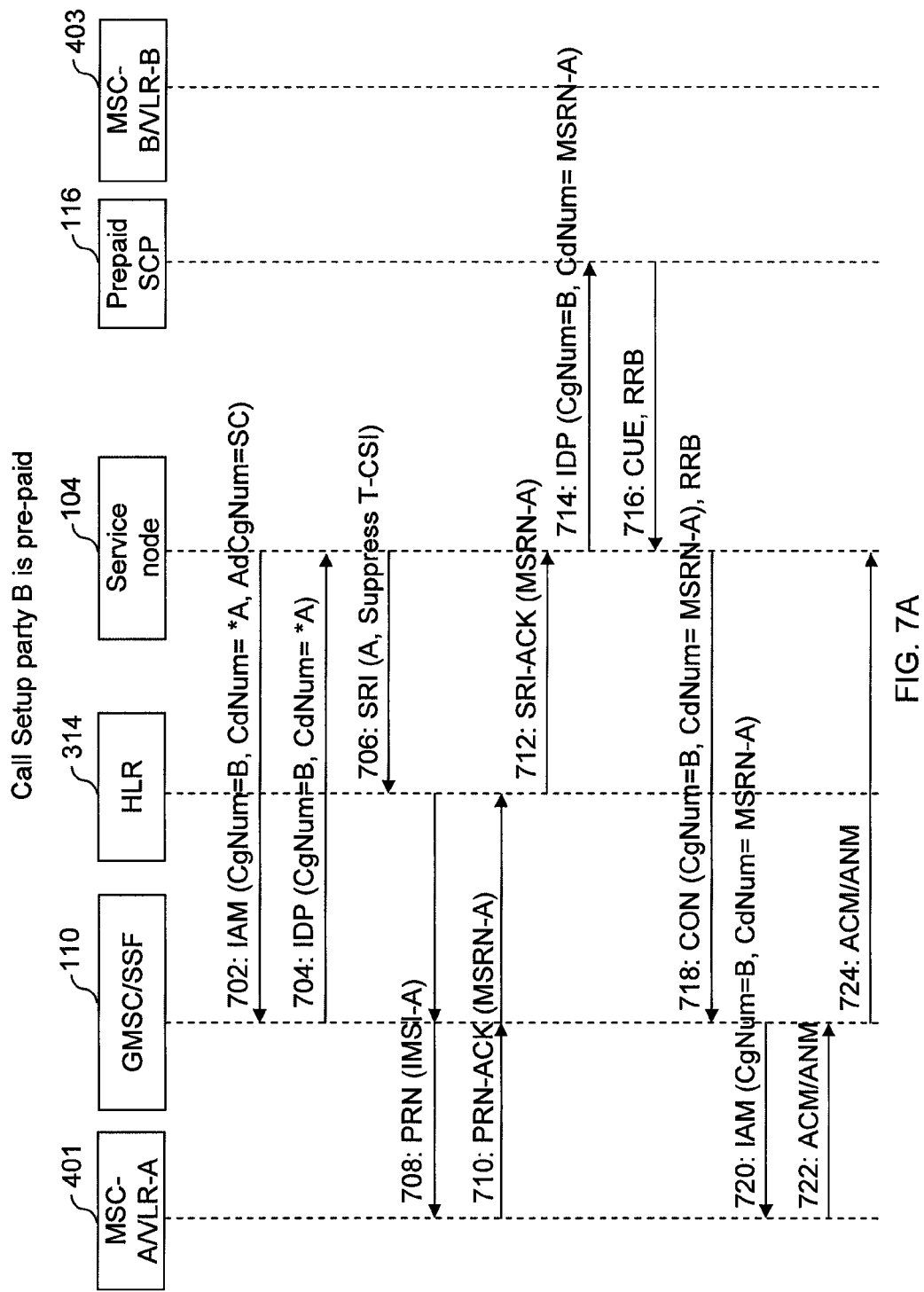
FIGS. 7A, 7B and 7C illustrate a flow diagram for implementing reverse charge service for a collect call by calling party, in accordance with an embodiment of the present invention.
Figure 7B:
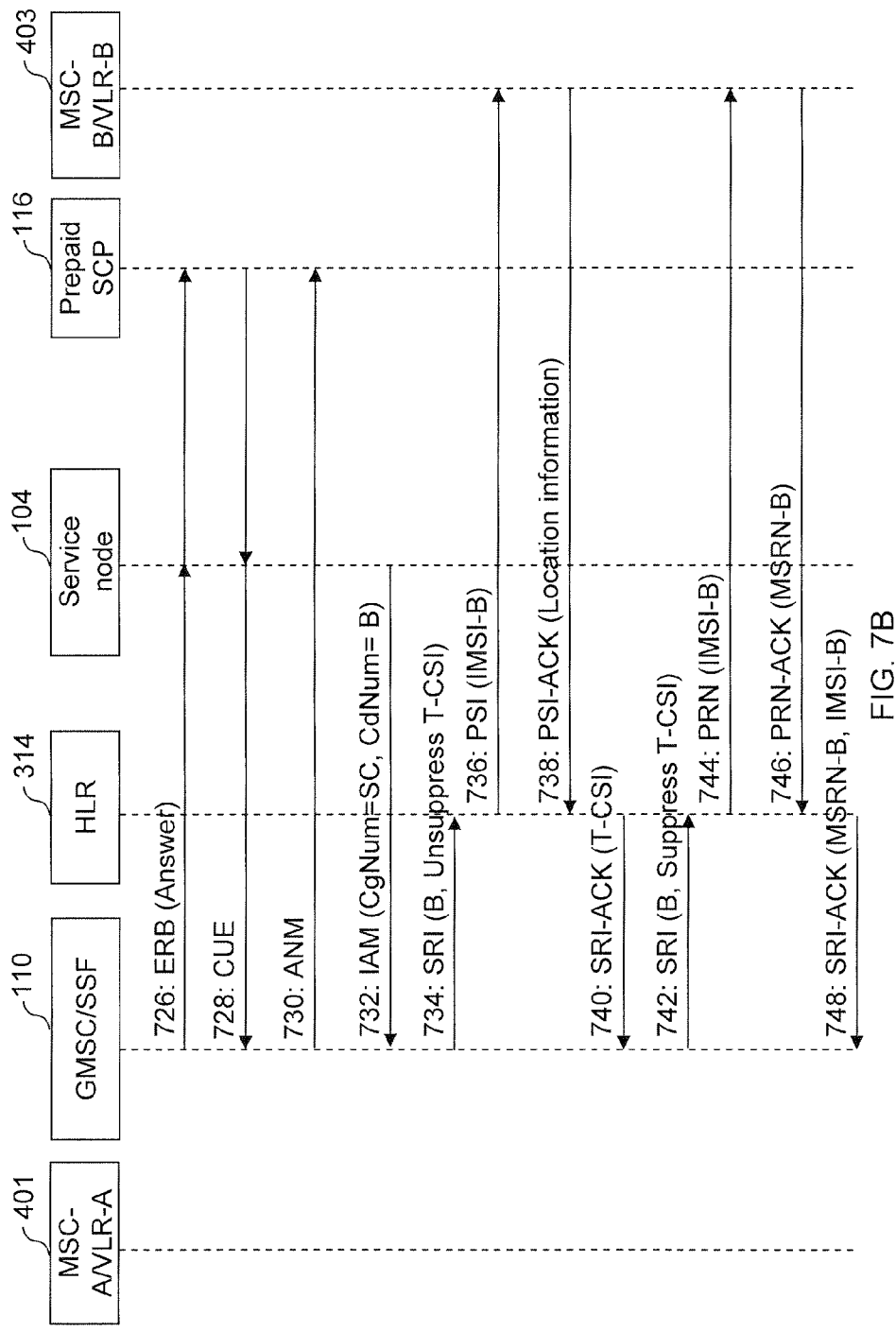
Figure 7C:
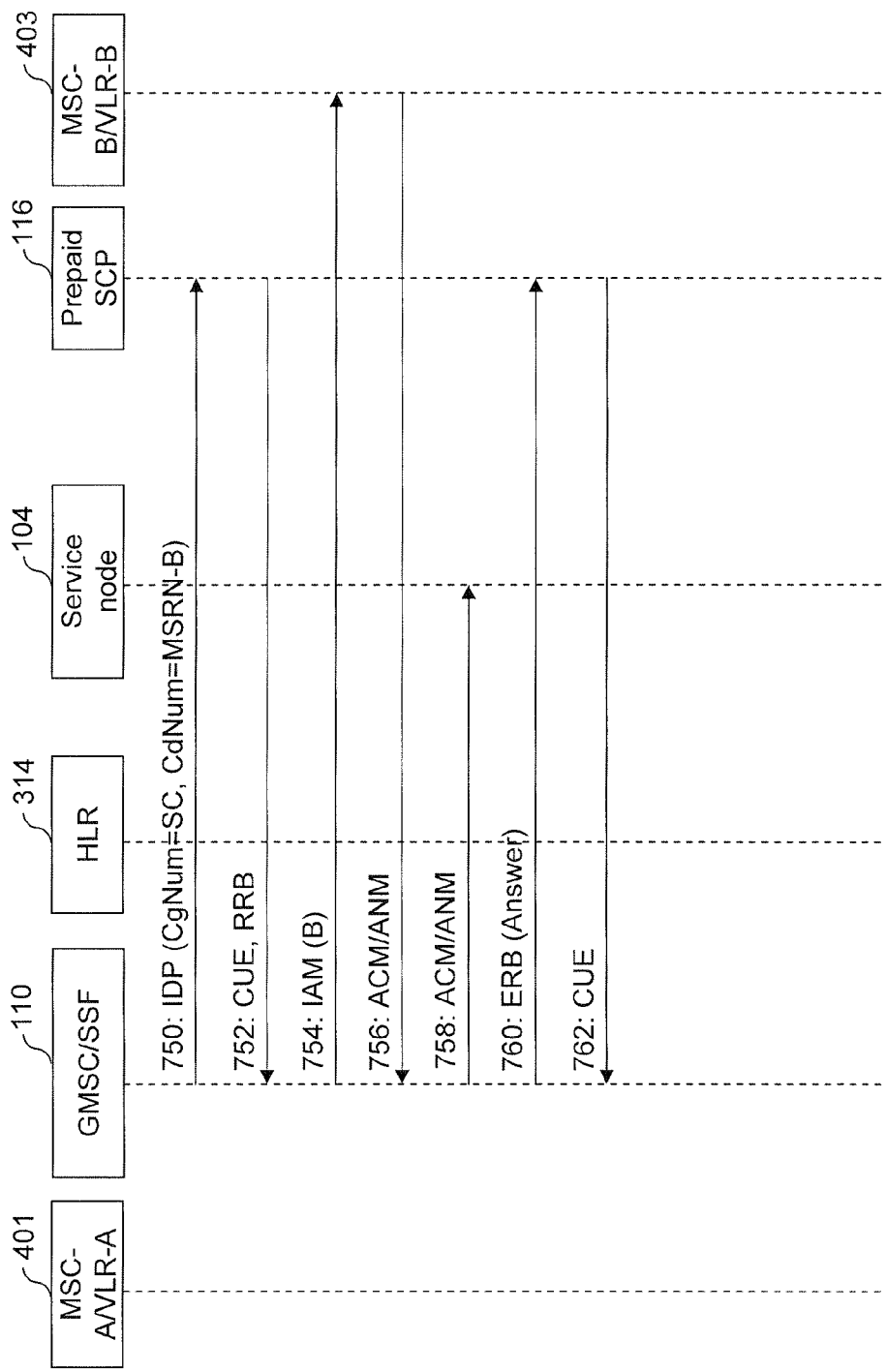
Figure 8A:
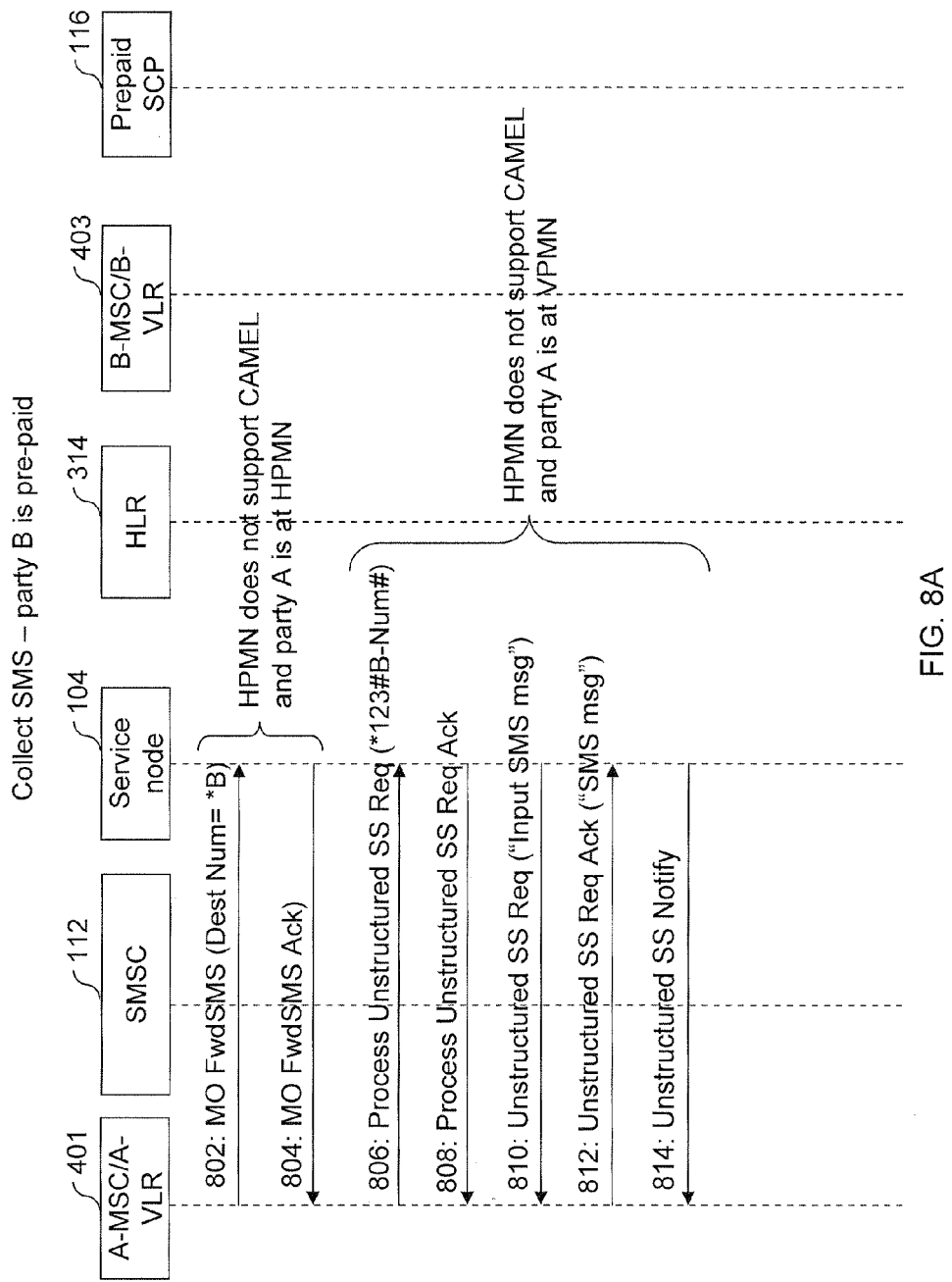
Figure 8B:
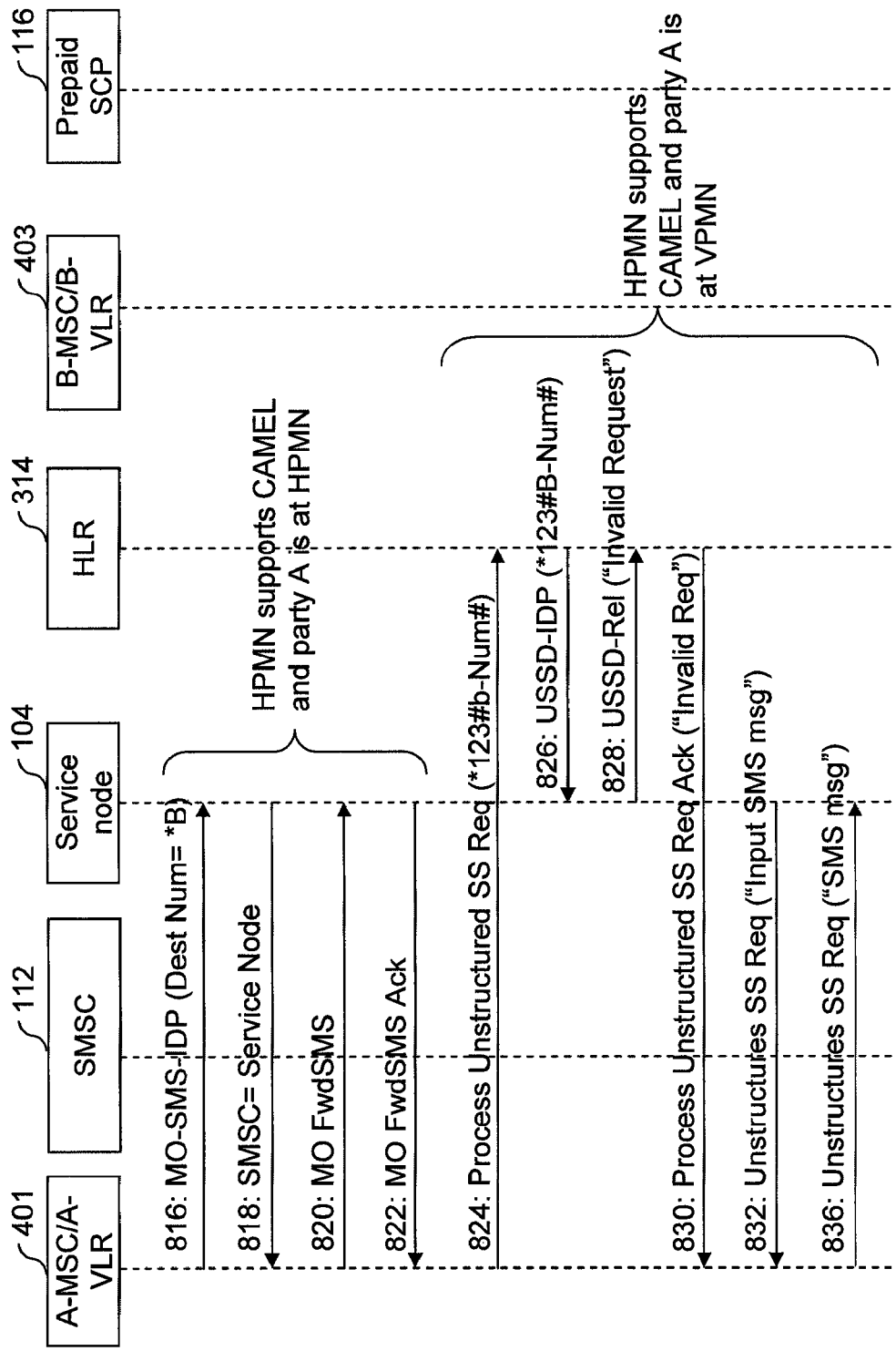
Figure 8C:
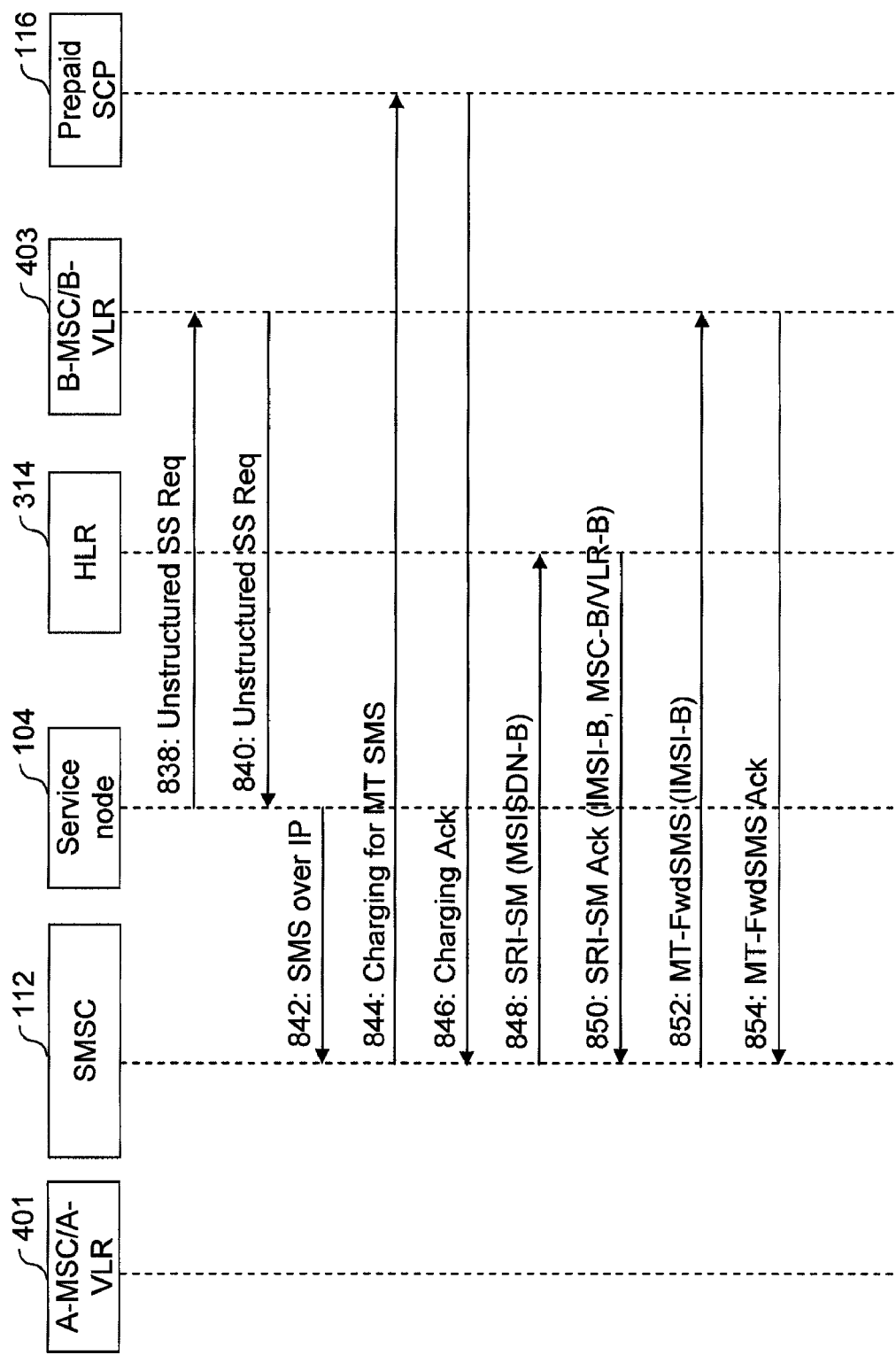

As discussed earlier, to establish a collect call, service node 104 needs to initiate separate MO calls to both party A and party B. FIGS. 7A, 7B and 7C illustrate a flow diagram for implementing reverse charge service for a collect call by calling party 106, in accordance with an embodiment of the present invention.

In this embodiment, service node 104 initiates a first MO call to calling party 106 and a second MO call to called party 108 and then bridges the first and the second MO calls to connect calling party 106 and called party 108. Hence, at step 702, service node 104 initiates an ISUP IAM call to GMSC/SSF 110 with CdPA as party A's number with a prefix '*', and CgPA as party B's number. As mentioned earlier, the CLI shown to party A is controlled by setting an Additional Calling Address (AdCgPA) to an appropriate value. In an embodiment of the present invention, the AdCgPA is set to party B's number. In another embodiment of the present invention, the AdCgPA is set to service node 104's short code. Thereafter at step 704, GMSC/SSF 110 sends an Intelligent Network (IN) Initial Destination Point (IDP) message to service node 104, based on the prefixed CdPA. Then, at step 706, upon receiving the IN IDP message with the prefixed party A's number, service node 104 issues a MAP Send Routing Information (SRI) message with suppressed Terminating CAMEL Subscription Information (T-CSI) and party A's Mobile Station International Subscriber Directory Number (MSISDN-A) to HLR 314, to obtain a Mobile Station Routing Number (MSRN) associated with party A (MSRN-A). It will be apparent to a person of ordinary skill in the art that the steps 706 to 712 represent a standard procedure for obtaining MSRN-A.

Thereafter at step 714, once MSRN-A is obtained, service node 104 issues an IN IDP message to pre-paid SCP 116 with CdPA as MSRN-A and CgPA as party B's number. In an embodiment of the present invention, this IN IDP message enables pre-paid SCP 116 to charge party B appropriately for the first MO call on the MSRN-A. At step 716, when party B has enough credit in his a prepaid account then pre-paid SCP 116 responds with an IN Continue (CUE) message and Request Report Basic call state model event (RRB) message. Thereafter at step 718, service node 104 sends an IN Connect (CON) message to GMSC/SSSF 110 with CdPA as MSRN-A and CgPA as party B's number. Upon receiving the IN CON message, at step 720, GMSC/SSF 110 issues an ISUP IAM message with CdPA as MSRN-A and CgPA as party B's number. When party A is reachable and answers the ISUP IAM call, service node 104 receives answer message relayed through GMSC/SSF 110, at steps 722 and 724. Further, at step 726, GMSC/SSF 110 sends Event Report Basic call state model (ERB) message to prepaid SCP 116. In response to the IN ERB messages, prepaid SCP 116 relays IN CUE message to GMSC/SSF 110. In an embodiment of the present invention, at step 730, service node 104 is equipped with voice trunks and plays an announcement to party A, while it connects the second MO call to the party B.

To initiate the second MO call, service node 104, at step 732, initiates an ISUP IAM call to GMSC/SSF 110 with CdPA as party B's number and CgPA as the short code assigned to service node 104. Again, the CLI shown to party B is controlled by setting the AdCgPA to an appropriate value. In an embodiment of the present invention, the AdCgPA is set to party A's number. In another embodiment of the present invention, the AdCgPA is set to service node 104's short code. Thereafter, at step 734, GMSC/SSF 110 initiates a MAP SRI with unsuppressed T-CSI to HLR 314 to obtain MSRN corresponding to party B (MSRN-B). It will be apparent to a person of ordinary skill in the art that the steps 734 to 748 represent a standard procedure for obtaining MSRN. Thus at step 748, GMSC/SSF 110 obtains the MSRN-B.

Furthermore, at step 750, GMSC/SSF 110 sends an IN IDP message to pre-paid SCP 116 with CdPA as MSRN-B and CgPA as short code of service node 104. In an embodiment of the present invention, when party B is present in HPMN 102 and MT calls are not charged then prepaid SCP 116 returns an IN CUE message at step 752. In another embodiment of the present invention, when party B is roaming in the VPMN then prepaid SCP 116 checks for the appropriate balance in the party B's prepaid account and if sufficient balance is available, SCP 116 sends an IN CUE message to GMS/SSF 110 at step 752. Thereafter at step 754, GMSC/SSF 110 forwards the ISUP IAM message to MSC-B/VLR-B 403. When party B is available and answers the call, service node 104 receives answer message at step 756 and 758. In an embodiment of the present invention, service node 104 is equipped with voice trunks (IVR option) and plays an announcement to party B, while it bridges the first MO call and the second MO call via ISUP loop-back. Further, at step 760, GMSC/SSF 110 sends ERB message to prepaid SCP 116. In response to the IN ERB message, prepaid SCP 116 relays IN CUE message to GMSC/SSF 110 at step 762.

In an embodiment of the present invention, when called party 106 is a postpaid subscriber, the call flow for called party 106 remains similar to what is explained in conjunction with FIGS. 7A, 7B and 7C except that IN messages are exchanged with prepaid SCP 116.

Charging Scenario when the Called Party is a Postpaid Subscriber

In an embodiment of the present invention, charging of the post-paid subscribers is done using the call Detail Records (CDRs) from GMSC/SSF 110.

Charging the first MO call to party A, with CgPA as party B's number.
1. When party A is roaming, then CdPA contains a foreign MSRN and therefore the call is rated appropriately to charge party B.
2. When party A is at HPMN 102, the call is local and therefore the MSRN-A is local and the call is rated accordingly to charge party B.

Further, in an embodiment of the present invention, no roaming call forwarding CDR is generated and therefore no MTC roaming charges are levied on party A.

Charging of the second MO call to party B, with CdPA as B party and CgPA as service node 104's short code.
1. When party B is in HPMN 102 and MT calls are not charged, then the charging for the second MO call is ignored.
2. When party B is roaming in the VPMN, the IN ticket for this second MO call contains MSRN of the VPMN and therefore the call is rated accordingly to charge party B.

Charging Scenario when the Called Party is a Prepaid Subscriber

Charging the first MO call to party A

When GMSC/SSF 110 issues an IDP message for the first MO call to service node 104, service node 104 issues a MAP SRI with suppress T-CSI to HLR 314 and gets MSRN-A in the response. Service node 104 then uses this MSRN-A as CdPA to initiate an IN IDP message to prepaid SCP 116, with CgPA as party B's number This allows prepaid SCP 116 to charge the first MO call appropriately and according to the received MSRN-A. Service Node 104 then acts as GMSC/SSF 110 and monitors the call according to prepaid SCP 116's needs and thus relays the answer and release events as and when they happen.

Charging the second MO call to party B

When GMSC/SSF 110 raises an IN IDP message to pre-paid SCP 116 with CdPA as MSRN-B, prepaid SCP 116 charges called party 108 appropriately on the basis of the MSRN-B and the CgPA (short code for service node 104).

In an embodiment of the present invention, when party A is roaming in a VPMN network that charges airtime for MT calls, the VPMN operator will generate Transfer Account Procedure (TAP) files to be billed to party A. When party A is a prepaid subscriber, this charging may not be possible in real time. Even when party A is a postpaid subscriber, there may be chances that party B may not be willing to bear this charge. To avoid these situations, collect calls from such network are disallowed by adding the VPMN network into a black list.

As mentioned earlier, the reverse charge service also includes sending a collect SMS by calling party 106 to called party 108, for which called party 108 pays. In an embodiment of the present invention, for sending the collect SMS, calling party 106 sends a MO SMS with a destination number as a prefixed called party 108's number. When the MO SMS reaches service node 104, service node 104 verifies whether calling party 106 is a valid subscriber of reverse charge service or not. In an embodiment of the present invention, service node 104 verifies the validity of calling party 106 using database 330. In an embodiment of the present invention, database 330 stores a list of valid subscribers (i.e., calling parties) that have registered for the reverse charge service. In an embodiment of the present invention, when calling party 106 is an invalid subscriber, service node 104 sends a notification to calling party 106 indicating that since calling party 106 is not subscribed for the reverse charge service, therefore his request for sending the collect SMS cannot be entertained. In an embodiment of the present invention, service node 104 notifies calling party 106 using the USSD interface. In another embodiment of the present invention, service node 104 notifies calling party 106 using the SMS interface.

In an embodiment of the present invention, when calling party 106 is a valid subscriber of the reverse charge service, service node 104 sends a request to called party 108 indicating that calling party 106 wants to send a collect SMS. In an embodiment of the present invention, service node 104 sends the request to called party 108 using the USSD interface. In another embodiment of the present invention, service node 104 sends the request to called party 108 using the SMS interface. In an embodiment of the present invention, called party 108 accepts the request of calling party 106 to send the collect SMS and sends his confirmation to service node 104. Service node 108 upon receiving the approval from called party 108, forwards the SMS (sent by calling party 106) to called party 108 and charges called party 108 for that SMS. In an embodiment of the present invention, called party 108 rejects the request of calling party 106 and sends his rejection to service node 104. Even for rejection called party 108 may send his response using either the USSD interface or the SMS interface. Service node 104 upon receiving a rejection from called party 108 sends a notification to calling party 106 indicating that called party 108 has rejected collect SMS request. In an embodiment of the present invention, service node 104 notifies calling party 106 using the USSD interface. In another embodiment of the present invention, service node 104 notifies calling party 106 using the SMS interface.

Further, in an embodiment of the present invention, calling party 106 is able to send collect SMS even when HPMN 102 does not support CAMEL transactions. In another embodiment of the present invention, calling party 106 is able to send collect SMS when HPMN 102 supports CAMEL transactions. In both these embodiments calling party 106 can be located either at HPMN 102 or at the VPMN. As mentioned earlier, for sending a collect SMS, calling party 106 first needs to submit an MO SMS to service node 104. When calling party 106 is located at HPMN 102 the MO SMS is not charged. However, when calling party 106 is located at the VPMN, the VPMN can charge for the MO SMS to service node 104. In one case to avoid charging of MO SMS when calling party 106 is at the VPMN, service node 104 sends a negative acknowledgement message for all the MO SMSs which are submitted with a prefixed number. With this negative acknowledgement message an MSC associated with the VPMN assumes a failure in the delivery of the SMS and does not charge for the MO SMS. Service node 104 can later deliver the SMS to called party 108 and can charge called party 108 for the MO SMS. In another case to avoid charging of MO SMS at the VPMN, calling party 106 sends a USSD request to USSD gateway 114. This USSD request is handled by service node 104. When service node 104 receives the USSD request from calling party 106, service node 104 initiates a USSD transaction with calling party 106 and prompts him to enter the message content. Calling party 106 enters the message content in the USSD reply message. Service node 104 uses this message sent by calling party 106 and converts it into an SMS. Service node 104 then submits this SMS to SMSC 112 with a prefix to called party 108's number. As USSD service is provided free by most of the mobile operators, VPMN does not charge for the message submitted with the help of USSD. Thus, depending upon whether HPMN 102 has a CAMEL support or not and whether calling party 106 is located in HPMN 102 or in the VPMN, service node 104 provides four options for calling party 106 to submit MO SMS to service node 104.

FIGS. 8A, 8B, 8C and 8D illustrate a flow diagram for implementing reverse charge service for a collect SMS by calling party 106, in accordance with an embodiment of the present invention. As mentioned above, to initiate collect SMS, party A first submits an MO SMS to service node 104 and then service node 104 enables the collect SMS procedure. In a first case, when HPMN 102 does not support CAMEL and party A is at HPMN 102, party A submits the MO SMS to service node 104 by adding a prefix (e.g., '*') to party B's number. This MO SMS form party A reaches MSC-A/VLR-A 401. Thereafter, at step 802, MSC-A/VLR-A 401 sends a MO-FwdSMS message to service node 104. Service node 104, after receiving the MO SMS verifies whether party A is a valid subscriber of reverse charge service or not and further sends an acknowledgement message for the received MO-FwdSMS at step 804. In an embodiment of the present invention, when service node 104 identifies that party A is an invalid subscriber of the reverse charge service, service node 104 cancels the submitted MO-FwdSMS and sends a negative acknowledgement message. In another embodiment of the present invention, when service node 104 identifies that party A is valid subscriber of reverse charge service, service node 104 sends a positive acknowledgement message for the received MO-FwdSMS. Service node 104 then enables the collect SMS procedure which is explained later in conjunction with this figure.

In a second case of submitting MO SMS, when HPMN 102 does not support CAMEL and party A is at the VPMN, then party A issues an USSD message to service node 104. An example of the USSD message could be *123#B-Num#, where B-Num corresponds to party B's number. HLR 314 upon receiving this USSD message routes it to MSC-A/VLR-A 401. Thereafter at step 806, MSC-A/VLR-A 401 sends a USSD message "Process Unstructured SS Req (*123#B-Num#)" to service node 104. Service node 104, after receiving the USSD message verifies whether party A is a valid subscriber of reverse charge service or not. In an embodiment of the present invention, when service node 104 identifies that party A is an invalid subscriber of the reverse charge service, service node 104 cancels the USSD message and sends a notification message to party A and ends the USSD transaction. In another embodiment of the present invention, when service node 104 identifies that party A is valid subscriber of reverse charge service, service node 104 at step 808, sends a notification message "Process Unstructured SS Req Ack" to MSC-A/VLR-A 401 for party B, indicating that his request is being processed. Thereafter at step 810, service node 104 sends a "MAP Unstructured SS Req ("Input SMS msg")" message to MSC-A/VLR-A. Party A upon receiving this message enters the message content which is to be sent as collect SMS and sends it back to MSC-A/VLR-A 401. Thus, at step 812, MSC-A/VLR-A 401 sends a message "Unstructured SS Req Ack ("SMS msg")" to service node 104. Service node 104 after obtaining the message content for collect SMS, sends a notification message "Unstructured SS Notify" for party A (via MSC-A/VLR-A 401) at step 812. After sending the notification message, service node 104 stores the message in database 330 and then enables the collect SMS procedure which is explained later in conjunction with this figure.

In a third case when HPMN 102 supports CAMEL and party A is at HPMN 102, then party A submits the MO SMS to service node 104 by adding a prefix (e.g., '*') to party B's number. Hence, at step 816, MSC-A/VLR-A 401 sends an IDP message "MO-SMS-IDP (Dest Num=*B)" to service node 104. Service node 104, after receiving the IDP message verifies whether party A is a valid subscriber of reverse charge service or not. In an embodiment of the present invention, when service node 104 identifies that party A is an invalid subscriber of the reverse charge service, service node 104 sends a release message and prevents rejects further messages from party A. In another embodiment of the present invention, when service node 104 identifies that party A is valid subscriber of reverse charge service, service node 104 at step 818 sends a message to MSC-A/VLR-A 401 to change SMSC 112's address to service node 104's address. Based on this change is address, MSC-A/VLR-A 401 routes MO FwdSMS to service node 104. Service node 104 then at step 822 sends an acknowledgment message "MO FwdSMS Ack" to MSC-A/VLR-A 401 and enables the collect SMS procedure which is explained later in conjunction with this figure.

In a fourth case when HPMN 102 supports CAMEL and party A is at the VPMN, then party A issues an USSD message. An example of the USSD message could be *123#B-Num#, where B-Num corresponds to party B's number. Hence, at step 824, MSC-A/VLR-A 401 sends a USSD message "Process Unstructured SS Req (*123#b-Num#)" to HLR 314. In an embodiment of the present invention, HLR 314 is provisioned with UG-CSI (USSD Generic CAMEL Subscription Information). Due to the UG-CSI, HLR 314 at step 826, routes the USSD message to service node 104. Thereafter, service node 104 verifies whether party A is a valid subscriber of reverse charge service or not. In an embodiment of the present invention, when service node 104 identifies that party A is an invalid subscriber of the reverse charge service, service node 104, at step 828, sends a USSD message "USSD-Rel ("Invalid Request")". Thereafter, at step 830, HLR 314 sends a USSD message "Process Unstructured SS Req Ack ("Invalid Req")" to MSC-A/VLR-A and thus notifying that party A is an invalid subscriber. Service node 104 further ends the USSD transaction. In another embodiment of the present invention, when service node 104 identifies that party A is valid subscriber of reverse charge service, service node 104 at step 832, sends a "MAP Unstructured SS Req ("Input SMS msg")" message to MSC-A/VLR-A. Party A upon receiving this message enters the message content which is to be sent as collect SMS and sends it back to MSC-A/VLR-A 401. Thus at step 836, MSC-A/VLR-A 401 sends a message "Unstructured SS Req Ack ("SMS msg")" to service node 104. Service node 104 after obtaining the message content, sends a notification message "Unstructured SS Notify" for party B (via MSC-A/VLR-A 401). After sending the notification message, service node 104 stores the message in database 330 and then enables the collect SMS procedure which is explained later in conjunction with this figure.

Once party B has submitted the SMS to service node 104 through any of the above mentioned four options, service node 104 enables the collect SMS procedure. In this procedure, at step 838, service node 104 sends a USSD request message like "Unstructured SS Req" to MSC-B/VLR-B 403 with an indication for party B that party A has requested for a collect SMS. At step 840, MSC-B/VLR-B sends an acknowledgement message "Unstructured SS Resp" to service node 104. In an embodiment of the present invention, party B upon receiving the USSD request message via MSC-B/VLR-B 403 accepts the request for the collect SMS from party A. Thereafter, at step 842, service node 104 sends the MO SMS to SMSC 112 over the IP protocol. Further, at step 844, SMSC 112 sends a message "Charging for MT SMS" to prepaid SCP 116 so as to charge party B for the collect SMS. Thereafter, at step 846, prepaid SCP sends an acknowledgement message "Charging Ack" to SMSC 112. Thereafter at steps 848 and 850, SMSC 112 exchanges standard MAP messages with HLR 314 to obtain an International Mobile Subscriber Identity (IMSI) associated with party B (IMSI-B). After obtaining IMSI-B, at steps 852 and 854 SMSC 112 sends an MT FwdSMS message to MSC-B/VLR-B 403 and receives an acknowledgment message from MSC-B/VLR-B. Thereafter, MSC-B/VLR-B delivers the SMS to party B and party B is charged for that SMS.

In another embodiment of the invention, when party B rejects the request for the collect SMS from party A, service node 104 sends a notification to party A indicating that party B has rejected the request of the collect SMS. At step 856, service node sends a USSD message "Unstructured SS Notify" notifying party A that the request for collect SMS has been rejected by party B. Further, at step 858, service node 104 receives a USSD message "Unstructured SS Notify Resp" from party A via MSC-A/VLR-A 401.

In an alternate embodiment of the present invention, service node 104 interacts with party A (via MSC-A/VLR-A 401) and party B (via MSC-B/VLR-B 403) via the SMS interface instead of USSD interface as explained above. Further, the interactions between MSC-A/VLR-A 401 and MSC-B/VLR-B 403 is done via SMSC 112 when the SMS interface is used by service node 104.

Further, when called party 108 is a postpaid subscriber, billing of called party 108 for collect SMS is handled by obtaining CDRs from SMSC 112 and MSC-B/VLR-B 403. These CDRs can be fed into a mediation or billing system. These CDRs are rated on the basis of SMS Type (MO/MT), called number and calling number to charge called party 108.

When called party 108 is a prepaid subscriber, billing of called party 106 for collect SMS is handled in real time. Further, when HPMN 102 supports CAMEL, called party 108 is charged in real-time using CAP triggers to pre-paid SCP 116.

It will be apparent to a person skilled in the art, that the present invention can also be applied to Code Division Multiple Access (CDMA)/American National Standards Institute #41D (ANSI-41D), and various other technologies such as, but not limited to, VoIP, WiFi, 3GSM and inter-standard roaming. In one exemplary case, a CDMA outbound roamer travels with an HPMN CDMA handset. In another exemplary case, the CDMA outbound roamer travels with an HPMN GSM SIM and a GSM handset. In yet another exemplary case, GSM outbound roamer travels with an HPMN CDMA RUIM and a CDMA handset. To support these variations, gateway 104 and client 106 will have a separate SS7 and network interfaces, corresponding to both the HPMN and FPMN networks. It will also be apparent to a person skilled in the art that these two interfaces in different directions may not have to be the same technologies. Moreover, there could be multiple types of interface in both directions.

An exemplary list of the mapping between GSM MAP and ANSI-41D is described in the table below as a reference.

| GSM MAP | ANSI-41D |
| --- | --- |
| Location Update/ISD | REGNOT |
| Cancel Location | REGCAN |
| RegisterSS | FEATUREREQUEST |
| InterrogateSS | FEATUREREQUEST |
| SRI-SM | SMSREQ |
| SRI | LOCATION REQUEST |
| ForwardSMS | SMSDPP |
| ReadyForSMS | SMSNOTIFICATION |

| GSM MAP | ANSI-41D |
|---|---|
| AlertServiceCenter | SMSNOTIFICATION |
| ReportSMSDelivery | SMDPP |
| ProvideRoamingNumber | ROUTING REQUEST |

The present invention provides a reverse charge service for the subscribers of the HPMN. With the help of reverse charge service, a calling party is able to make calls and send SMS to a called party, for which the called party is charged. The reverse charge service is useful for both prepaid and post subscribers. When prepaid subscribers are out of balance and they still want to make calls and send SMSs they can use the reverse charge service to make collect calls and send collect SMS. When postpaid subscribers do not want to spend on outgoing calls or when their calls are barred, they can use the reverse charge service to make collect calls and send collect SMS. The reverse charge service increases revenues of the HPMN operator as the called party pays for the calling party when he is out of balance or when his outgoing activities are barred or when he does not wish to pay for the outgoing calls and SMS (maybe when he is in roaming and wants to avoid airtime charges).

The present invention can take the form of an entirely hardware embodiment, an entirely software embodiment, or an embodiment containing both hardware and software elements. In accordance with an embodiment of the present invention, software, including but not limited to, firmware, resident software, and microcode, implements the invention.

Furthermore, the invention can take the form of a computer program product, accessible from a computer-usable or computer-readable medium providing program code for use by, or in connection with, a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CDROM), compact disk-read/write (CD-R/W) and Digital Versatile Disk (DVD).

A computer usable medium provided herein includes a computer usable program code, which when executed, facilitates mobile communication between a calling party and a called party, by establishing the mobile communication, by a service node, upon receiving a response from the called party for a mobile communication request made by the calling party to the service node. Further, the computer program product facilitates by the service node, charging of the called party for the established mobile communication.

The components of present system described above include any combination of computing components and devices operating together. The components of the present system can also be components or subsystems within a larger computer system or network. The present system components can also be coupled with any number of other components (not shown), such as other buses, controllers, memory devices, and data input/output devices, in any number of combinations. In addition, any number or combination of other processor-based components may be carrying out the functions of the present system.

It should be noted that the various components disclosed herein may be described using computer aided design tools and/or expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Unless the context clearly requires otherwise, throughout the description and the claims, the words "comprise," "comprising," and the like are to be construed in an inclusive sense as opposed to an exclusive or exhaustive sense; that is to say, in a sense of "including, but may not be limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, it covers all of the following interpretations: any of the items in the list, all of the items in the list and any combination of the items in the list.

The above description of illustrated embodiments of the present system is not intended to be exhaustive or to limit the present system to the precise form disclosed. While specific embodiments of, and examples for, the present system are described herein for illustrative purposes, various equivalent modifications are possible within the scope of the present system, as those skilled in the art will recognize. The teachings of the present system provided herein can be applied to other processing systems and methods. They may not be limited to the systems and methods described above.

The elements and acts of the various embodiments described above can be combined to provide further embodiments. These and other changes can be made in light of the above detailed description.

Other Variations

Provided above for the edification of those of ordinary skill in the art, and not as a limitation on the scope of the invention, are detailed illustrations of a scheme for charging a called party for the mobile communication initiated by a calling party. Numerous variations and modifications within the spirit of the present invention will of course occur to those of ordinary skill in the art in view of the embodiments that have been disclosed. For example, the present invention is implemented primarily from the point of view of GSM mobile networks as described in the embodiments. However, the present invention may also be effectively implemented on GPRS, 3G, CDMA, WCDMA, WiMax etc., or any other network of common carrier telecommunications in which end users are normally configured to operate within a "home" network to which they normally subscribe, but have the capability of also operating on other neighboring networks, which may even be across international borders.

The examples under the system of present invention detailed in the illustrative examples contained herein are described using terms and constructs drawn largely from GSM mobile telephony infrastructure. However, use of these examples should not be interpreted as limiting the invention to those media. The system and method can be of use and provided through any type of telecommunications medium, including without limitation: (i) any mobile telephony network including without limitation GSM, 3GSM, 3G, CDMA, WCDMA or GPRS, satellite phones or other mobile telephone networks or systems; (ii) any so-called WiFi apparatus normally used in a home or subscribed network, but also configured for use on a visited or non-home or non-accustomed network, including apparatus not dedicated to telecommunications such as personal computers, Palm-type or Windows Mobile devices; (iii) an entertainment console platform such as Sony Playstation, PSP or other apparatus that are capable of sending and receiving telecommunications over home or non-home networks, or even (iv) fixed-line devices made for receiving communications, but capable of deployment in numerous locations while preserving a persistent subscriber id such as the eye2eye devices from Dlink; or telecommunications equipment meant for voice over IP communications such as those provided by Vonage or Packet8.

In describing certain embodiments of the system under the present invention, this specification follows the path of a telecommunications call, from a calling party to a called party. For the avoidance of doubt, such a call can be a normal voice call, in which the subscriber telecommunications equipment is also capable of visual, audiovisual or motion-picture display. Alternatively, those devices or calls can be for text, video, pictures or other communicated data.

In the foregoing specification, specific embodiments of the present invention have been described. However, one of ordinary skill in the art will appreciate that various modifications and changes can be made without departing from the scope of the present invention as set forth in the claims below. Accordingly, the specification and the figures are to be regarded in an illustrative rather than a restrictive sense, and all such modifications are intended to be included within the scope of present invention. The benefits, advantages, solutions to problems, and any element(s) that may cause any benefit, advantage, or solution to occur, or to become more pronounced, are not to be construed as a critical, required, or essential feature or element of any or all of the claims.

APPENDIX

| Acronym | Description |
|---|---|
| API | Application Programming Interface |
| CAMEL | Customized Application for Mobile Enhanced Logic |
| CAP | CAMEL Application Part |
| CdPA | Called Party Address |
| CgPA | Calling Party Address |
| CDR | Call Detail Record |
| CIMD2 | Computer Interface to Machine Distribution, version 2 |
| CLI | Calling Line Identification |
| CSI | Camel Subscription Information |
| CRM | Customer Relationship Management |
| DTMF | Dual Tome Multi Frequency |
| ECF | Early Call Forwarding |
| ERB | Event Report Basic call state model |
| GMSC | Gateway MSC |
| GPRS | General Packet Radio Services |
| GUI | Graphical User Interface |
| GT | Global Title |
| HLR | Home Location Register |
| HPMN | Home Public Mobile Network |
| HTTP | Hypertext Transfer Protocol |
| IAM | Initial Address Message |
| IDP | Initial Destination Point |
| IN | Intelligent Network |
| INAP | Intelligent Network Application Part |
| IP | Internet Protocol |
| ISD | MAP Insert Subscriber Data |
| ISUP | ISDN User Part |

APPENDIX-continued

| Acronym | Description |
|---|---|
| IVR | Interactive Voice Response |
| LCF | Late Call Forwarding |
| LUP | Location Update |
| MAP | Mobile Application Part |
| MO | Mobile Originated |
| MSC | Mobile Switching Center |
| MSISDN | Mobile Station International Subscriber Directory Number |
| MSRN | Mobile Station Roaming Number |
| MT | Mobile Terminated |
| O&M | Operation and Maintenance |
| PC | Point Code |
| RRB | Request Report Basic call state model event |
| SC | Short Code |
| SCP | Signaling Control Point |
| SCCP | Signal Connection Control part |
| SME | Short Message Entity |
| SMPP | Short Message Peer-to-Peer |
| SMS | Short Message Service |
| SMSC | Short Message Service Center |
| SNMP | Simple Network Management Protocol |
| SRI | MAP Send Routing Information |
| SRI-SM | MAP Send Routing Information For Short Message |
| SS7 | Signaling System #7 |
| SSF | Service Switching Function |
| STP | Signal Transfer Point |
| TAP | Transfer Account Procedure |
| T-CSI | Terminating CAMEL Subscription Information |
| TCAP | Transaction Capabilities Application Part |
| TCP | Transmission Control Protocol |
| USSD | Unstructured Supplementary Services Data |
| VLR | Visitor Location Register |
| VPMN | Visited Public Mobile Network |
| VT-CSI | Visited Terminated CAMEL Service Information |
| XML | eXtensible Markup Language |

Technical References, Each of which is Incorporated by Reference Herein:
GSM 902 on MAP specification
Digital cellular telecommunications system (Phase 2+); Mobile Application Part (MAP) Specification
(3GPP TS 09.02 version 7.9.0 Release 1998);
GSM 378 CAMEL Architecture, Release 1998;
GSM 978 CAMEL Application Protocol, Release 1998;
GSM 340 on SMS
Digital cellular telecommunications system (Phase 2+); Technical realization of the Short Message Service (SMS); (GSM 03.40 version 7.4.0 Release 1998)
Q1214-Q1218 on Intelligent Networks
Q701-704 on SS7 MTP
Q711-Q714 on SS7 SCCP
TD.35 NRTRDE Format for Fraud information
FF.18 NRTRDE Business Requirements
ETSI CS domain charging documents: TS 12.05, TS 32.005, TS 32.205, TS 32.298
ETSI PS domain charging documents: TS 12.15, TS 32.015, TS 32.215, TS 32.298
ETS 300 374-1 Intelligent Network (IN); Intelligent Network Capability Set 1 (CS1); Core Intelligent Network Application Protocol (INAP); Part 1: Protocol specification
EN 301 140-1 Intelligent Network (IN); Intelligent Network Application Protocol (INAP); Capability Set 2 (CS2); Part 1: Protocol specification
Jiang DCG 2005 Dynamic originating CAMEL approach for Implementing Call Control Services for Inbound Roamers, U.S. Provisional Patent Application Ser. No. 60/679,444;
Jiang et al 2003 Traffic Redirection
GSM 379 on CAMEL Support of Optimal Routing (SOR)
GSM 318 on CAMEL Basic Call Handling
ITU-T Recommendation Q.1214 (1995), Distributed functional plane for intelligent network CS-1;

ITU-T Recommendation Q.1218 (1995), Interface Recommendation for intelligent network CS-1;
ITU-T Recommendation Q.762 (1999), Signaling system No. 7—ISDN user part general functions of messages and signals;
ITU-T Recommendation Q.763 (1999), Signaling system No. 7—ISDN user part formats and codes;
ITU-T Recommendation Q.764 (1999), Signaling system No. 7—ISDN user part signaling procedures;
ITU-T Recommendation Q.766 (1993), Performance objectives in the integrated services digital network application;
ITU-T Recommendation Q.765 (1998), Signaling system No. 7—Application transport mechanism;
ITU-T Recommendation Q.769.1 (1999), Signaling system No. 7—ISDN user part enhancements for the support of Number Portability

We claim:

1. A method for facilitating mobile communication between a calling party and a called party, the calling party making a request for mobile communication with the called party to a service node, the calling party having a calling party number and the called party having a called party number, the method comprising:
   establishing, via the service node, mobile communication between the calling party and the called party upon receiving a response to the request from the called party; and
   facilitating, via the service node, charging the called party for the established mobile communication,
   wherein the mobile communication is established by initiating a first Mobile Originated (MO) call by the service node to the calling party and a second MO call by the service node to the called party, and
   wherein establishing the first MO call further comprises:
   initiating, at the service node, an Integrated Services Digital Network (ISDN) User Part (ISUP) Initial Address Message (IAM) call to a Gateway Mobile Switching Centre (GMSC)/Service Switching Function (SSF), associated with a Home Public Mobile Network (HPMN) of the calling party, with Called Party Address (CdPA) as the calling party number and Calling Party Address (CgPA) as the called party number;
   receiving, at the service node, an Initial Destination Point (IDP) message from the GMSC/SSF;
   obtaining, at the service node, a Mobile Station Routing Number (MSRN) associated with the calling party;
   issuing, at the service node, an IDP message to a prepaid Service Control Point (SCP), associated with the HPMN, with CdPA as the MSRN and CgPA as the called party number, when the called party is a prepaid subscriber;
   initiating, at the service node, a connect message to the GMSC/SSF with CdPA as the MSRN and CgPA as the called party number; and
   receiving, at the service node, an answer message indicating completion of the first MO call.

2. The method of claim 1, wherein the response is an approval from the called party to accept charges for the established mobile communication.

3. The method of claim 1, wherein, if the response is a rejection, the service node notifies the calling party of the rejection.

4. The method of claim 1, wherein the calling party makes the request by sending the called party number using an interface.

5. The method of claim 4, wherein the interface is one of an Unstructured Supplementary Service Data (USSD) interface, a Short Message Service (SMS) interface and an Interactive Voice Response (IVR) interface.

6. The method of claim 1, wherein the first MO call is established prior to the second MO call.

7. The method of claim 1, wherein the second MO call is established prior to the first MO call.

8. The method of claim 1, wherein the first MO call and the second MO call are established simultaneously.

9. The method of claim 1, wherein the first MO call and the second MO call are bridged by the service node via an Integrated Services Digital Network (ISDN) User Part (ISUP) loop back.

10. The method of claim 1, the service node sending a Calling Line Identification (CLI) to the calling party, the CLI including one of a short code of service node and the called party number.

11. The method of claim 1, the calling party having a number, the service node sending a Calling Line Identification (CLI) to the called party, the CLI including one of a short code of the service node and the calling party number.

12. The method of claim 1, wherein, upon detecting an early call forwarding status activated for the called party, the service node aborts the establishing of the mobile communication.

13. The method of claim 12, wherein the service node notifies the calling party of aborting the establishing of the mobile communication.

14. The method of claim 1, wherein the request for mobile communication further comprises:
   a request for sending a Short Message Service (SMS).

15. The method of claim 14, wherein sending the SMS further comprises:
   receiving, at the service node, a Mobile Originated (MO) SMS from the calling party with a prefixed destination number, wherein the prefixed destination number is the called party number; and
   verifying, via the service node, a validity of the calling party to submit the SMS.

16. The method of claim 14, wherein sending the SMS further comprises:
   receiving, at the service node, an Unstructured Supplementary Service Data (USSD) request message from the calling party, wherein the USSD request message includes the called party number;
   initiating by the gateway, a USSD message to the calling party, wherein the calling party sends message content of the SMS in reply to the USSD message; and
   verifying by the service node, validity of the calling party to submit the SMS.

17. The method of claim 1, wherein the calling party and the called party are associated with same operator.

18. The method of claim 1, wherein the service node interacts with a billing system to facilitate charging the called party for the established mobile communication.

19. The method of claim 1, wherein the service node maintains a blacklist including a Visited Public Mobile Network (VPMN) that charges airtime for a Mobile Terminated (MT) call to the calling party.

20. The method of claim 1, wherein the service node maintains a blacklist including the calling party that has a blocked or rejected request for mobile communication by the called party.

21. The method of claim 1, wherein the service node maintains a white list including the calling party that has mobile communication established without approval from the called party.

22. A method for facilitating mobile communication between a calling party and a called party, the calling party making a request for mobile communication with the called party to a service node, the calling party having a calling party number and the called party having a called party number, the method comprising:

establishing, via the service node, mobile communication between the calling party and the called party upon receiving a response to the request from the called party; and facilitating, via the service node, charging the called party for the established mobile communication, wherein the mobile communication is established by initiating a first Mobile Originated (MO) call by the service node to the calling party and a second MO call by the service node to the called party, and wherein establishing the second MO call further comprises: initiating, at the service node, an Integrated Services Digital Network (ISDN) User Part (ISUP) Initial Address Message (IAM) call to a Gateway Mobile Switching Centre (GMSC)/Service Switching Function (SSF), associated with a Home Public Mobile Network (HPMN) of the calling party, with Called Party Address (CdPA) as the called party number and Calling Party Address (CgPA) as a short code associated with the service node; and receiving, at the service node, an answer message indicating completion of the second MO call.

* * * * *